(12) United States Patent
Berg et al.

(10) Patent No.: US 11,498,650 B2
(45) Date of Patent: Nov. 15, 2022

(54) AUTOMATIC SAIL DEPOWERING AND CAMBER CONTROL

(71) Applicant: SIGNAL VENTURES LTD, London (GB)

(72) Inventors: Lowell J. Berg, Cambridge, MA (US); Jonathan Barrows, Somerville, MA (US); Eamon Carrig, Somerville, MA (US); Carl Nelson, Cambridge, MA (US)

(73) Assignee: Signal Ventures LTD, London (GB)

( * ) Notice: Subject to any disclaimer, the term of this patent is extended or adjusted under 35 U.S.C. 154(b) by 0 days.

(21) Appl. No.: 16/795,524

(22) Filed: Feb. 19, 2020

(65) Prior Publication Data
US 2020/0262532 A1    Aug. 20, 2020

Related U.S. Application Data

(60) Provisional application No. 62/807,383, filed on Feb. 19, 2019.

(51) Int. Cl.
*B63H 9/061*    (2020.01)
(52) U.S. Cl.
CPC .................. *B63H 9/0621* (2020.02)
(58) Field of Classification Search
CPC ... B63H 9/00; B63H 9/04; B63H 9/06; B63H 9/0621; B63H 9/067; B63H 9/08
USPC .............. 114/102.1, 102.12, 102.15, 102.16, 114/102.22, 102.29
See application file for complete search history.

(56) References Cited

U.S. PATENT DOCUMENTS

| | | | |
|---|---|---|---|
| 4,332,395 A * | 6/1982 | Zech | B62B 15/004 |
| | | | 280/213 |
| 4,563,970 A | 1/1986 | Walker | |
| 4,685,410 A | 8/1987 | Fuller | |
| 4,817,550 A * | 4/1989 | Gutsche | B62D 37/04 |
| | | | 114/124 |
| 4,958,582 A | 9/1990 | Vermillion et al. | |
| 5,423,274 A | 6/1995 | Benze | |

(Continued)

FOREIGN PATENT DOCUMENTS

| | | |
|---|---|---|
| CN | 2120763 U | 11/1992 |
| CN | 2748382 Y | 12/2005 |

(Continued)

OTHER PUBLICATIONS

International Search Report and Written Opinion, PCT/US2020/018910 dated Jul. 23, 2020.

*Primary Examiner* — Daniel V Venne
(74) *Attorney, Agent, or Firm* — Knobbe Martens Olson & Bear LLP

(57) ABSTRACT

An autonomous sailing vessel may include a hull, a mast, a sail, and a sail release device. The mast may be mechanically coupled to the hull. The sail may be mechanically coupled to the mast. The sail release device may be operably coupled to the sail and may be configured to automatically release the sail to spill excess wind. Alternatively or additionally, the sail may include a fore sail element coupled to the mast and an aft sail element rotatably coupled at a fore of the aft sail element to an aft of the fore sail element. In this and other embodiments, the autonomous sailing vessel may further include a camber control assembly to automatically set a camber angle between the fore and aft sail elements.

20 Claims, 11 Drawing Sheets

(56) References Cited

U.S. PATENT DOCUMENTS

| | | | |
|---|---|---|---|
| 5,724,905 A * | 3/1998 | Pizzey | B63H 9/06 114/102.29 |
| 6,116,178 A * | 9/2000 | McCabe | B63H 9/061 114/102.13 |
| 7,461,609 B1 | 12/2008 | Ott et al. | |
| 7,712,427 B2 | 5/2010 | Ott et al. | |
| 8,069,801 B2 | 12/2011 | Ott et al. | |
| 8,726,824 B2 | 5/2014 | Jarke | |
| 8,973,511 B2 | 3/2015 | Holemans | |
| 9,003,986 B2 | 4/2015 | Jenkins et al. | |
| 9,616,984 B2 | 4/2017 | Peddie | |
| 9,834,290 B2 | 12/2017 | Jenkins et al. | |
| 9,896,162 B2 | 2/2018 | McClure | |
| 10,029,773 B1 | 7/2018 | Todter et al. | |
| 10,399,652 B2 | 9/2019 | Todter et al. | |
| 10,467,908 B2 | 11/2019 | Johnson | |
| 10,611,449 B2 | 4/2020 | Holemans et al. | |
| 10,625,841 B2 | 4/2020 | Todter | |
| 11,084,561 B2 | 8/2021 | Jenkins | |
| 2011/0265700 A1 | 11/2011 | Mallet | |
| 2014/0116311 A1 | 5/2014 | Holemans | |
| 2016/0147223 A1 | 5/2016 | Edwards et al. | |
| 2017/0267324 A1 | 9/2017 | Vandyck et al. | |
| 2018/0127075 A1 | 5/2018 | Johnson | |
| 2018/0217588 A1 | 8/2018 | Edwards et al. | |
| 2019/0339700 A1 | 11/2019 | Berg et al. | |
| 2020/0012283 A1 | 1/2020 | Nguyen | |
| 2020/0262532 A1 | 8/2020 | Berg et al. | |
| 2021/0214916 A1 | 7/2021 | Kodaira et al. | |

FOREIGN PATENT DOCUMENTS

| | | |
|---|---|---|
| CN | 201158446 Y | 12/2008 |
| CN | 101750614 A | 6/2010 |
| CN | 102211649 A | 10/2011 |
| CN | 104260866 A | 1/2015 |
| CN | 204078050 U | 1/2015 |
| CN | 105752280 A | 7/2016 |
| CN | 104015908 B | 1/2018 |
| CN | 109703706 A | 5/2019 |
| CN | 107000814 B | 4/2020 |
| CN | 108528640 B | 4/2020 |
| CN | 109649590 B | 12/2020 |
| CN | 109533211 B | 4/2021 |
| EP | 0069091 B1 | 10/1985 |
| EP | 2976257 A1 | 10/2016 |
| FI | 20175010 L | 7/2018 |
| FR | 2804931 A1 | 8/2001 |
| FR | 3008378 A1 | 1/2015 |
| FR | 3089490 A1 | 6/2020 |
| GB | 2511731 A | 9/2014 |
| GB | 2578183 A | 4/2020 |
| JP | H 04277216 A | 10/1992 |
| KR | 20130047186 A | 5/2013 |
| KR | 102074565 B1 | 2/2020 |
| WO | WO 2013064155 A1 | 5/2013 |
| WO | WO 2019086762 A1 | 5/2019 |

\* cited by examiner

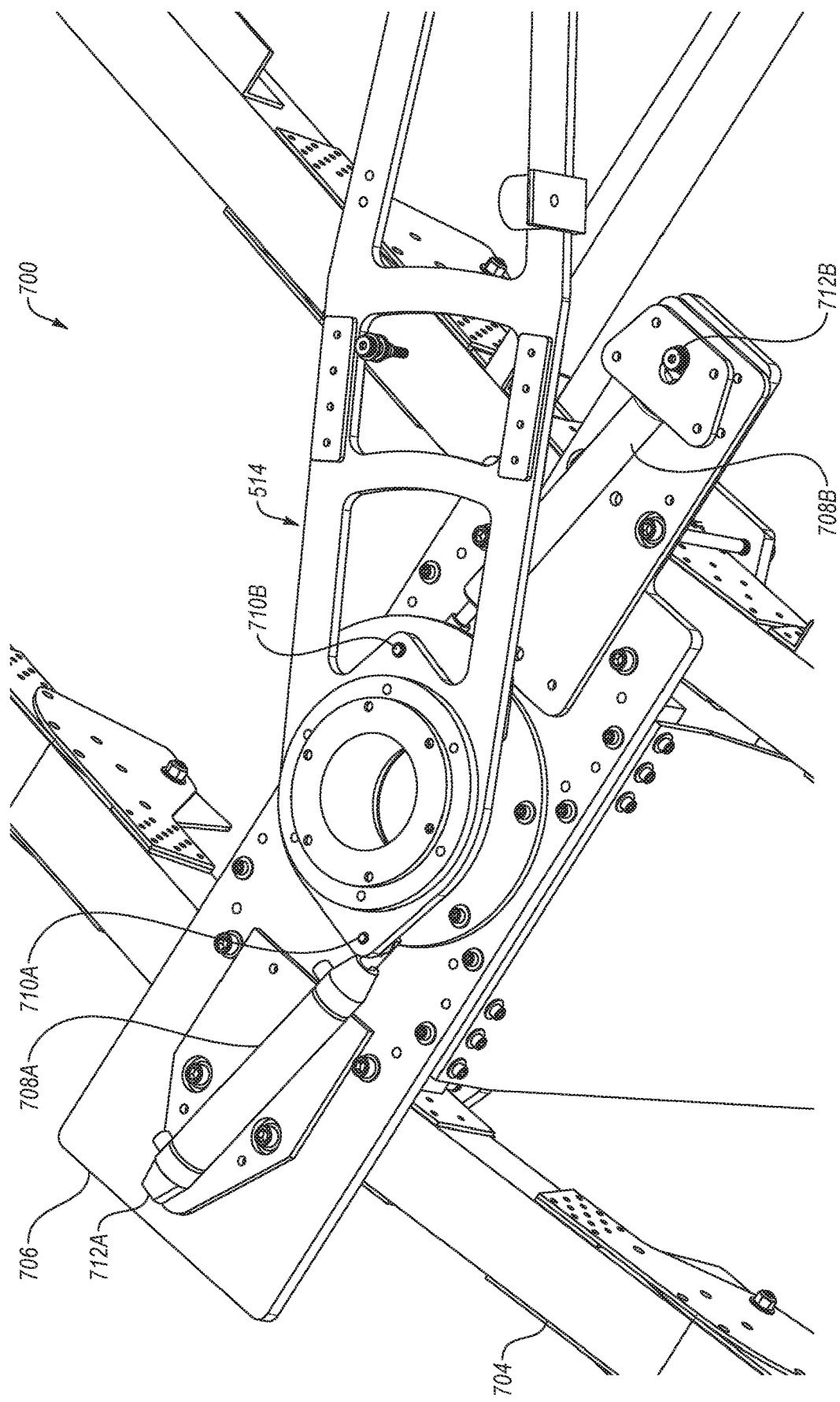

US 11,498,650 B2

AUTOMATIC SAIL DEPOWERING AND CAMBER CONTROL

CROSS-REFERENCE TO RELATED APPLICATION

This patent application claims the benefit of and priority to U.S. Provisional App. No. 62/807,383 filed Feb. 19, 2019, which is incorporated herein by reference.

FIELD

The implementations discussed herein relate to automatic sail depowering and camber control.

BACKGROUND

Unless otherwise indicated in the present disclosure, the materials described in the present disclosure are not prior art to the claims in the present application and are not admitted to be prior art by inclusion in this section.

Autonomous marine sailing vessels are used for unmanned oceangoing missions to make measurements on the ocean. They are controlled by onboard control units, such as onboard computers, and have onboard sensors to detect wind direction, wind speed, heading, position, and possibly sea state. Programs running on the onboard computers direct the sailing vessel to sail in useful patterns to either sail a particular track or hold position near a target location.

Sailing vessels may have one or more hulls for flotation. They may have one or more sails, such as rigid wing sails or stretched flexible membrane sails. Their sails may be single element, or more complicated multi-element sails. A defining characteristic of sailing vessels is that they harness wind power for propulsion. Some autonomous sailing vessels may have auxiliary propulsion systems not powered by wind or wind forces on the sailboat.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an example, an autonomous sailing vessel may include a hull, a mast, a sail, and a sail release device. The mast may be mechanically coupled to the hull. The sail may be mechanically coupled to the mast. The sail release device may be operably coupled to the sail and may be configured to automatically release the sail to spill excess wind.

In another example, an autonomous sailing vessel may include a hull, a mast, a sail, and a camber control assembly. The mast may be mechanically coupled to the hull. The sail may be mechanically coupled to the mast. The sail may include a fore sail element coupled to the mast and an aft sail element rotatably coupled at a fore of the aft sail element to an aft of the fore sail element. The camber control assembly may be configured to automatically set a camber angle between the fore and aft sail elements.

BRIEF DESCRIPTION OF THE DRAWINGS

Example implementations will be described and explained with additional specificity and detail through the use of the accompanying drawings in which:

FIG. 7B is a detail view of a portion of the autonomous sailing vessel of FIG. 7A, all arranged in accordance with at least one embodiment described herein.

DETAILED DESCRIPTION

Figure 1:
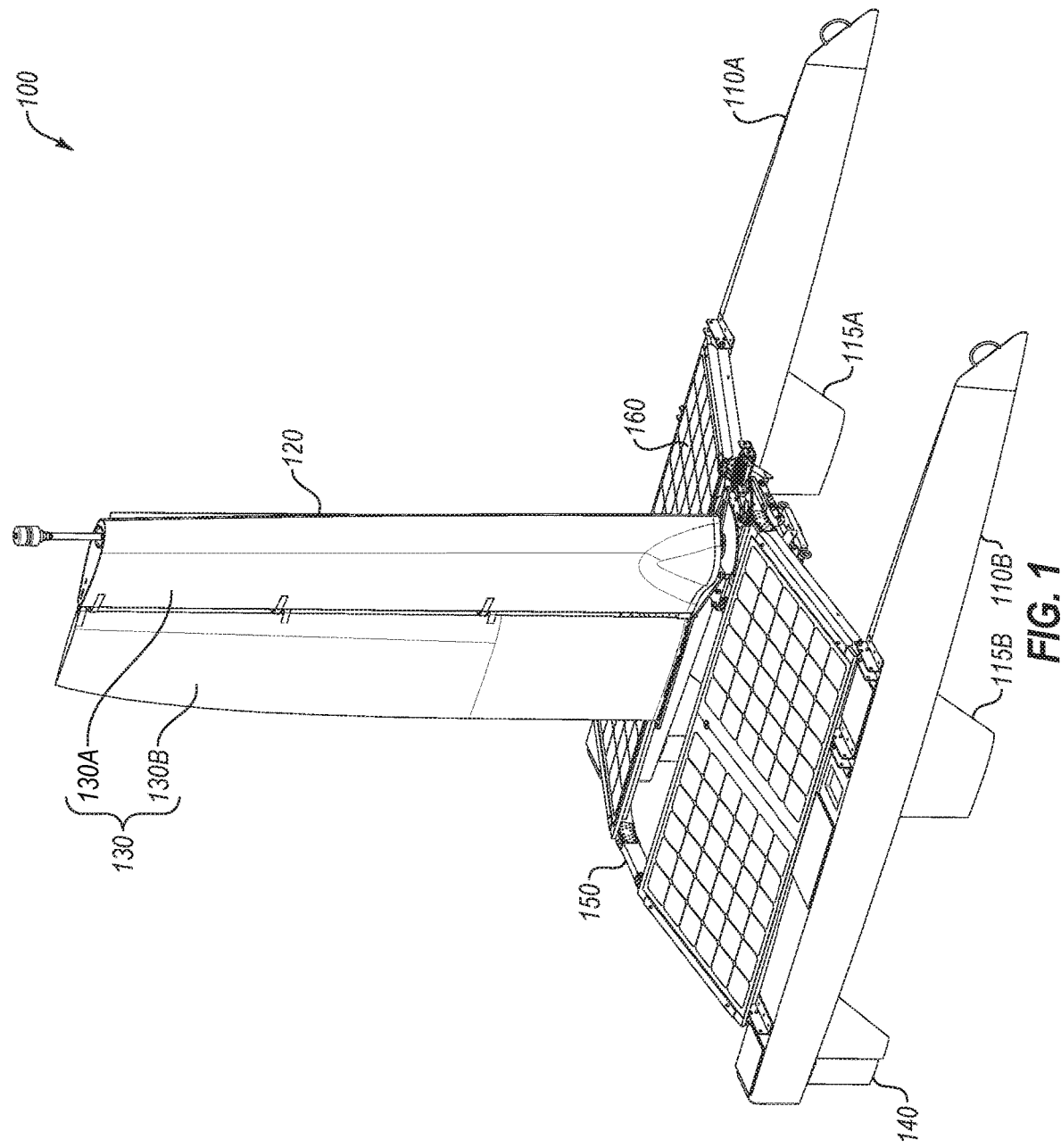
FIG. 1 illustrates an example autonomous sailing vessel.

All sailing vessels have underwater control surfaces to aid in generating useful propulsion forces from the wind. To maintain the vessel's target heading, an autonomous sailing vessel will set rudder position (usually rudder angle) via an actuator controlled by the onboard computer. The sail or sails will be set differently depending on the wind's direction relative to the boat's heading or travel direction. All sailing vessels have a (usually small) angular difference between their heading and their travel direction, also referred to as leeway. As leeway is not particularly relevant to embodiments described herein, the term heading is used herein to mean either the direction of an aft-to-fore line of the boat, or the instantaneous travel direction.

Manned sailing vessels are many thousands of years old. Autonomous sailing vessels are a relatively new concept and as such, many features and embodiments of features are not necessarily de facto prior art just because they are used on manned vessels. For example, sailors on manned sailing vessels manually release wind from the sail to avoid overturning the vessel under excess wind. Some embodiments described herein automatically release a vessel's sail to spill (i.e., release) excess wind without human intervention. Various specific novel means of releasing wind from the sail on an autonomous sailing vessel are described in more detail below.

Some autonomous sailing vessels control the position of the sail relative to the rest of the vessel by adding secondary aerodynamic surfaces offset from and coupled to the main sail. These secondary aerodynamic surfaces can be controlled relative to the wind to generate forces that can be used to align the sail at a specified angle relative to the vessel. Examples have been disclosed by Harbor Wing Technologies in U.S. Pat. Nos. 7,461,609, 7,712,427, and 8,069,801 and by Saildrone in U.S. Pat. Nos. 9,834,290 and 9,003,986. The foregoing patents are incorporated herein by reference.

Some autonomous sailing vessels have actuators to control the angular position of the sail relative to the rest of the vessel. The simplest autonomous sailing vessels have sails that generally are in a state biased by the wind to one side or the other of the vessel. The state to one side or the other is established by a stop, usually mechanical or electromechanical, that establishes the angular position of the sail about its rotational axis. An example is disclosed by Offshore Sensing AS in U.S. Pat. No. 9,616,984, which is incorporated herein by reference.

Accordingly, some embodiments described herein include a sail release device for autonomous sailing vessels, where the sail release device is configured to automatically (e.g., without human intervention or involvement) release the sail to spill excess wind. The sail release device may be coupled to a frame or other portion of the vessel for sail position control or may be coupled inline with an actuator used for sail position control. Alternatively or additionally, embodiment described herein may include a sail relatch device configured to automatically relatch the sail in a powered position, e.g., responsive to rotation of the sail from a depowered position to the powered position.

Moreover, for an autonomous sailing vessel with a two-element rigid wing sail, it is highly advantageous to have a relative angle between the two elements change depending on whether the vessel is on a port tack or a starboard tack. This relative angle is referred to as the camber angle. To control the camber angle, the rotation of the aft element relative to the fore element is confined in a restricted range, for example from −15 degrees to +15 degrees.

Some embodiments described herein automatically control camber angle. In an example, a mechanical coupling device references a position of the fore sail element and uses that reference to establish the camber angle between the fore and aft sail elements. In another example, a camber control boom defines an opening to receive a hinge pin that rotatably couples the fore sail element and the aft sail element together. The opening confines rotation of the aft sail element relative to the fore sail element to a predetermined angular range. An aft end of the aft sail element may be confined within a slot at an aft end of the camber control boom.

These and other implementations of the present disclosure will be explained with reference to the accompanying figures. It is to be understood that the figures are diagrammatic and schematic representations of such example implementations, and are not limiting, nor are they necessarily drawn to scale. In the figures, features with like numbers indicate like structure and function unless described otherwise.

FIG. 1 illustrates an example autonomous sailing vessel 100, arranged in accordance with at least one embodiment described herein. Various example aspects of autonomous sailing vessels that may be included in the autonomous sailing vessel 100 of FIG. 1 or other autonomous sailing vessels described herein are described in U.S. Pat. No. 8,973,511, U.S. Patent Publication No. 2018/0217588, and U.S. Patent Publication No. 2019/0339700, each of which is incorporated herein by reference in its entirety.

Some specific pertinent aspects of the autonomous sailing vessel 100 are described as follows. Referring to FIG. 1, the autonomous sailing vessel 100 may include one or more hulls 110A, 110B (generally hull or hulls 110), a mast 120, a sail 130, and a rudder 140. The autonomous sailing vessel 100 may further include a connector structure 150, one or more lights, one or more solar panels 160 or other power generator equipment, one or more sensors, or one or more other components. Other configurations than illustrated are contemplated.

As illustrated in FIG. 1, the autonomous sailing vessel 100 includes two hulls 110 spaced apart from and parallel to each other. Alternatively, the autonomous sailing vessel 100 may include a single hull 110, or three or more hulls 110. The autonomous sailing vessel 100 may include a barge, a monohull, a catamaran, a trimaran (triple hull catamaran), a proa, or other suitable sailing vessel.

The mast 120 may be mechanically coupled, directly or indirectly, to the hull 110A or 110B. A first component may be considered to be indirectly coupled to a second component when the first component is coupled to the second component through one or more intervening components. In the illustrated embodiment of FIG. 1, the mast 120 is mechanically coupled indirectly to both of the hulls 110 through the connector structure 150, which may include a truss, a platform, or other elements or components.

The sail 130 may be mechanically coupled, directly or indirectly, to the mast 120. In the illustrated embodiment of FIG. 1, the mast 120 is mechanically coupled directly to the connector structure 150. The sail 130 in FIG. 1 includes a wingsail rotatably coupled to the mast 120. As illustrated, sail includes a fore sail element 130A and an aft sail element 130B having an adjustable camber angle therebetween. Various camber control mechanisms are described in more detail below.

The rudder 140 may be mechanically coupled, directly or indirectly, to the hull 11B. Although not visible in FIG. 1, the hull 110A may alternatively or additionally have a rudder mechanically coupled thereto. While the rudder 140 in FIG. 1 is illustrated as being coupled directly to the hull 110B, in other embodiments the rudder 140 may be coupled indirectly to one or both of the hulls 110, e.g., through the connector structure 150. The rudder 140 (or multiple rudders if included in the autonomous sailing vessel 100) may be actively controllable, e.g., by a processor or other computer device of the autonomous sailing vessel 100, with or without actively controlling the sail 130 to regulate a heading or course of the autonomous sailing vessel 100.

As illustrated in FIG. 1, each of the hulls 110 includes a keel 115A, 115B (generally keel or keels 115). Alternatively, a single one of the hulls 110 may include a keel or one or more keels may be supported by and mechanically coupled to the connector structure 150 rather than or in addition to the hulls 110.

The solar panels 160 or other power generator equipment may be mechanically coupled to one or more of the hulls 110 or the connector structure 150. As illustrated, the solar panels 160 are supported on the connector structure 150.

As described in more detail below, the autonomous sailing vessel 100 may further include a sail release device, a sail relatch device, or camber control.

In some embodiments, the autonomous sailing vessel 100 may include an auxiliary propulsion device (not shown in FIG. 1). The autonomous sailing vessel 100 may further include a control unit having communication and other monitoring equipment, or water-tight compartments, e.g., within one or more of the hulls 110, within which additional equipment may be configured. The solar panels 160 may provide the energy required to power the auxiliary propulsion device as well as the on-board communication, control, and monitoring systems. Optionally, the propulsion device, if included, may be configured to generate electricity while the autonomous sailing vessel 100 travels under sail.

The autonomous sailing vessel 100 may include multiple water-tight compartments. In a typical configuration, one of the compartments includes the navigation and communication control systems and battery storage, and the remaining compartments are available for mission-specific payload systems.

One or both of the keels 115 may be configured to contain monitoring devices (not illustrated) for surface and underwater monitoring, such as, telephony equipment or acoustic modems, among other things. The hulls 110 and connector structure 150 may also be configured to contain other monitoring devices, depending upon the particular mission.

The control unit of the autonomous sailing vessel 100 may control overall operations of the autonomous sailing vessel 100. More particularly, the control unit may control a heading or course of the autonomous sailing vessel 100 and may receive sensor data that may be collected using one or more sensors that may be included in the autonomous sailing vessel 100. More generally, the control unit may control any and all operations of the autonomous sailing vessel 100 that may be remotely executed, commanded or controlled.

Although not shown in FIG. 1, a controller or processor, a RF transceiver, a GPS receiver, or any other similar or suitable position information receiver, a battery unit, a memory, and at least one of the one or more sensors may be included in the control unit. The RF transceiver may be used for transmitting or receiving any type of RF signal used for wireless communication. The controller may execute processing, computations, and communication functions and operations for the controlling of the overall operations of the autonomous sailing vessel 100. The controller may read data from and write data to the memory which may be employed to store data used for the control of the operations of the autonomous sailing vessel 100, data generated by the one or more sensors, data transmitted or received by the RF transceiver, and any other similar or suitable type of data.

The control unit may be placed anywhere on the autonomous sailing vessel 100 so long that it may be operatively connected to parts of the autonomous sailing vessel 100 which the control unit controls or communicates with. For example, the rudder 140 may be connected to the controller included in the control unit using a wired or a wireless connection to receive a rudder control signal. Accordingly, the controller may control a position of the rudder 140 using the rudder control signal.

The autonomous sailing vessel 100 or multiple instances thereof may be included in a system to, e.g., conduct marine monitoring. Such a system may include, e.g., a fleet of autonomous sailing vessels (such as the autonomous sailing vessel 100), a network, a control station, a monitoring station, or other systems or devices. Additional details regarding an example of such a system are disclosed in U.S. Patent Publication No. 2019/0339700.

Figure 2:
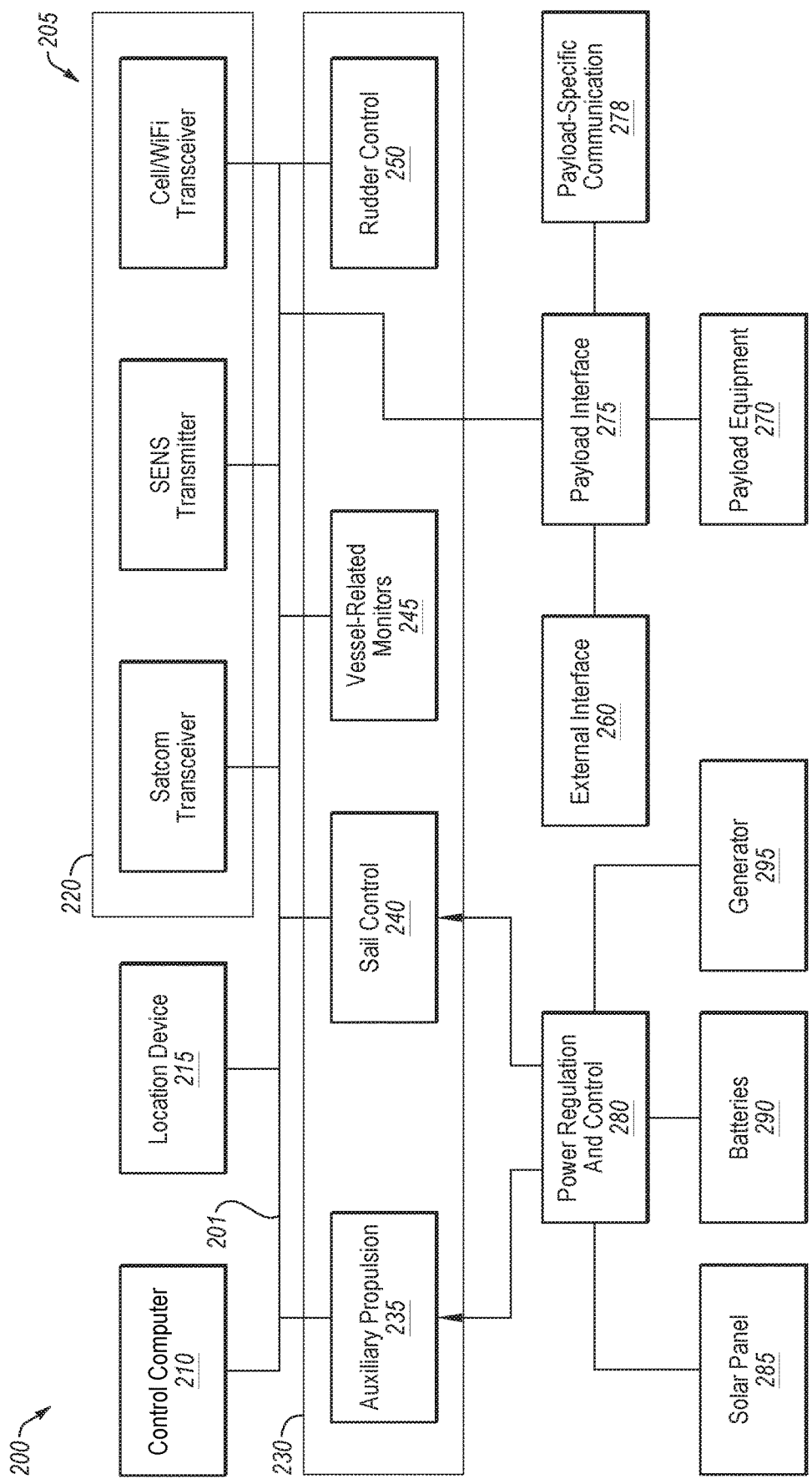
FIG. 2 is a block diagram of an example autonomous sailing vessel that includes a control unit.

FIG. 2 is a block diagram of an example autonomous sailing vessel 200 that includes a control unit 205, arranged in accordance with at least one embodiment described herein. The autonomous sailing vessel 200 may include or correspond to any of the other autonomous sailing vessels described herein. The control unit 205 may include or correspond to the control unit described in connection with FIG. 2. The control unit 205 may include one or more of a control computer 210, a location device 215, a communication interface 220, or other devices or systems.

The control computer 210 may coordinate operation of the equipment on the corresponding autonomous sailing vessel. The degree of interaction and control of the payload mission specific monitoring exercised by the control computer 210 may vary, depending upon the particular mission or the particular type of monitoring.

Although illustrated as a single block, the control computer 210 may include multiple processing systems, including, for example, redundant systems for fail-safe operation or embedded systems customized for particular tasks, such as navigation (not shown). The operation of the control computer 210 may best be understood in the context of the equipment on board with which the control computer 210 interacts, as follows. The functions of the control computer 210 may be provided as programming for a general purpose computer having memory and a processor. In such a case, the control computer 210 may receive from time to time replacement instructions to update or modify the system programming of the control computer 210. For example, the replacement instructions may be received from a control station.

Alternatively or additionally, the functions of the control computer 210 may be provided as one or more application-specific integrated circuits (ASICs) especially for embedded processes of standard instrumentation such as communication and GPS as well as navigation systems.

The location device 215 may include a GPS receiver or other location device to determine a location of the autonomous sailing vessel 200. Depending upon the capabilities of the location device 215, other information, such as the speed and direction of travel, may also be provided; or, another element, such as the control computer 210, may determine the speed and direction of travel from the reported locations over time. Other means and methods for the location device 215 may be implemented. The location information may be provided on a communication bus 201 for use by any of the devices on the communication bus 201. The control computer 210 may use the current location of the autonomous sailing vessel 200 to determine a route to a target area, may use the speed and direction of travel information to trim the rudder (not shown in FIG. 2) to compensate for drift, and so on. The location information may also be included in one or more monitoring messages that may be transmitted from the autonomous sailing vessel 200.

The communication interface 220 may include a satellite communication (Satcom) transceiver, a Sensor Enabled Notification System (SENS) transmitter, a cell/WiFi transceiver, or other suitable communication devices. The communication interface 220 may receive messages for the autonomous sailing vessel 200 or may transmit messages from the autonomous sailing vessel 200 to, e.g., a control station or monitor station.

FIG. 2 also illustrates other equipment 230 of the autonomous sailing vessel 200. The equipment 230 may include auxiliary propulsion equipment 235, sail control 240, vessel-related monitors 245, or rudder control 250.

The auxiliary propulsion equipment 235 may provide directionally controlled propulsion on demand, e.g., when the sail is unable to achieve sufficient progress toward the target area, unable to maintain location in an assigned area, or when "weather-independent" control is required, such as in high traffic areas.

The sail control system 240 may actively control one or both of the angular position or camber angle of the sail of the autonomous sailing vessel 200. The sail control system 240 may include a sail-positioning actuator mechanically coupled between the sail and a fixed structure of the autonomous sailing vessel, such as the connector structure 150 of FIG. 1. The sail-positioning actuator may be communicatively coupled to a processor or other control computer 210 or the control unit 205. In some implementations, the sail control system 240 is omitted and the autonomous sailing vessel 200 may be implemented without active control of the sail.

The vessel-related monitors 245 may be provided to determine a status of the autonomous sailing vessel and its environment. The vessel-related monitors 245 may include, for example, a wind direction and speed monitor, a speed-thru-water transducer, a water velocity sensor, voltage and current monitors, inertial monitors, a sail orientation monitor, a rudder orientation monitor, heeling-angle monitor, compass heading monitor, or other suitable monitors or sensors.

The rudder control system 250 may actively control the orientation of the rudder of the autonomous sailing vessel 200 to regulate heading or course of the autonomous sailing vessel 200 optionally without actively controlling the sail. The rudder control system 250 may include a rudder actuator mechanically coupled to the rudder and communicatively coupled to a processor or other control computer 210 or the control unit 205.

An external interface 260 may be provided in the autonomous sailing vessel 200 to configure and test equipment during development and before and after each deployment.

As noted above, the autonomous sailing vessel 200 may be used to convey mission-specific payload equipment 270 to a target area. The payload equipment 270 may include a collection of monitoring devices, such as cameras, transducers, or other monitoring devices. Alternatively or additionally, the payload equipment 270 may include a loudspeaker system to make announcements under certain situations such as when a vessel is detected near a restricted area or a microphone system to provide for two-way vocal communications.

Other sensors that may be included in the mission-specific payload equipment 270 may include video and infrared cameras, scanners, acoustic sensors and hydrophones, conductivity sensors, oxygen and other gas sensors, barometers, and opto-fluidic water quality sensors, hydrocarbon detectors, Geiger counters, salinity and pH sensors, pressure sensors, or other sensors or monitoring devices.

The autonomous sailing vessel 200 may further include a payload interface 275 to integrate the payload equipment 270 into the control system, e.g., the control unit 205, of the autonomous sailing vessel 200. The payload interface 275 may be used to communicate any monitoring commands received from the communication interface 220, to communicate monitored information to the control computer 210, or directly to the communication interface 220. The payload may have its own payload-specific communication interface 278 that may be independent of the control unit's 200 communication interface 220.

The autonomous sailing vessel 200 may further include a power regulation and control system 280 to provide power to the various equipment on the autonomous sailing vessel 200. The power regulation and control system 280 may receive energy from solar panels 285 (which may include or correspond to the solar panels 160 of FIG. 1) that are mounted on the autonomous sailing vessel 200. A battery system that may include one or more batteries 290 may store some of this energy to provide power when the solar panels 285 are not generating electricity or to supply bursts of power in excess of that available from the solar panel 285 or a generator 295. Optionally, the auxiliary propulsion equipment 235 may include the generator 295 that generates electricity when the sail propels the autonomous sailing vessel 200. Other kinetic power harvesting techniques may be employed, such as a Witt generator, which may be implemented in or as the generator 295.

With combined reference to FIGS. 1 and 2, the orientation of the sail 130 relative to rest of the autonomous sailing vessel 100 may be determined by simple stops or may be controlled by an actuator. In either example, a particular problem for autonomous sailing vessels 100, 200 is how they react to sudden high wind gusts. In a manned sailing vessel, an experienced sailor will quickly and manually let out the sail to spill some of the wind and decrease the overturning moment of the forces of the wind on the sailing vessel. On the autonomous sailing vessels 100, 200, no manual intervention is possible and it is a serious problem to prevent excessive wind forces from overturning the autonomous sailing vessel 100, 200.

Whether the sail 130 is actively positioned for normal sailing by an actuator such as the sail control 240 or it is passively positioned for normal sailing by engagement with a stop, the sail 130 will still need to be released quickly and automatically in response to excessive wind forces on the sail 130. Providing quick and automatic release of the sail 130 responsive to excessive wind may prevent or at least reduce the likelihood of the autonomous sailing vessel 100, 200 being overturned by excessive wind forces on the sail 130. Some embodiments described herein use a sail-positioning actuator itself such as the sail control 240, when present, to quickly and automatically move the sail 130 into a lower wind force position to avoid overturning the autonomous sailing vessel 100, 200. For example, the sail control 240 of the autonomous sailing vessel 200 may include a sail-positioning actuator, as already mentioned, and the sail release device may be coupled in-line with the sail-positioning actuator or may be included as part of the sail-positioning actuator. In another example, a high-speed sail release device is provided that is sensitive to the wind force or torque and that releases/spills sail wind when a particular force or torque value is achieved. Such a sail release device may be used instead of the sail-positioning actuator in autonomous sailing vessels with or without the sail-positioning actuator.

Wind forces or torques on the sail 130 may be measured indirectly, for example by a force or torque measurement sensor integrated into the sail-positioning actuator, or by a force or torque measurement sensor integrated into a passive sail position stop or by some other sensor arrangement. For example, the sail control 240 may include an integrated force measurement sensor, or a force measurement sensor integrated into the passive sail position stop may be included in the vessel-related monitors 245. It does not matter where the force or torque is measured at the autonomous sailing vessel 100, 200, only that the wind forces or a meaningful proxy for the wind forces on the sail 130 are measured. Such a sensor may, for example be a strain gauge force transducer, an automatic readout spring scale, or some other force- or torque-measuring device. In this and other embodiments, the force measured may be communicated to the control unit 205 or control computer 210 of the autonomous sailing vessel 100, 200. The control unit 205 may then respond to measured forces in a useful way. For example, the control unit 205 may command the sail release device to release the sail 130 to spill wind and decrease wind forces. In an example, the sensor measures a force of wind on the sail, relative or absolute wind speed, pitch angle of the autonomous sailing vessel, roll angle of the autonomous sailing vessel, or a torque on the sail and if the measurement is in excess of a spill threshold, the control unit commands the sail release device to release the sail.

Instead of or in addition to wind forces, one or more measurement devices included in the vessel related monitors 245 may measure absolute or relative wind speed, vessel pitch angle, vessel roll angle, torque on the sale, or other parameters. The control unit 205 may actively control the sail release device to release the sail 130 responsive to excess wind which may be measurable through wind speed, vessel pitch, vessel roll, torque, or other parameters. In particular, the control unit 205 may command the sail release device to release the sail based on one or more of the foregoing parameters, e.g., responsive to one or more of the foregoing parameters exceeding a corresponding threshold.

Active control of the sail 130 or other component may refer to controlling and making adjustments to the position or orientation of the sail 130 relative to the hull 110 or other component of the autonomous sailing vessel 100, 200 responsive to one or more inputs.

Embodiments described herein are not limited to actively controlled sail release devices. For example, as an alternative to measuring the wind force on the sail or other parameter and generating a command to the sail-positioning actuator, the sail-positioning actuator or the sail-positioning stop may have an integrated passive mechanical release device that causes the sail position to be quickly and automatically changed when excessive wind force acts on the sail 130. The automatic release of the sail position may be accomplished without measuring the wind force directly. For example, it may be accomplished when the force on a spring-loaded latch or similar electrical or mechanical device exceeds a predetermined limit. When this pre-determined limit is reached, the sail-positioning device may automatically release the sail 130 in response to excessive wind forces on the sail.

During normal operation, or normal sailing, the sail 130 is set in a position for effective sailing and upon release of the position of the sail 130 via the sail release device, the wind will automatically reposition, e.g., rotate, the sail 130 to a position where the total wind force on the sail 130 is decreased significantly. Thus, after the sail 130 is released, the sail 130 may be directed so the main pressure-generating surfaces of the sail 130, and more particularly so surface normals of the main pressure-generating surfaces, are substantially perpendicular to the wind's direction. When the sail 130 is set in a position for effective sailing, e.g., in normal operation or normal sailing, the sail 130 may be said to be powered or to be in a powered position or state. After the sail 130 is released from the powered position to spill wind and is in a position that is not effective for sailing, the sail 130 may be said to be depowered or to be in a depowered position or state. The act of releasing the sail responsive to excessive wind may be referred to as depowering the sail 130.

In an example, the sail 130 of the autonomous sailing vessel 100 is a bi-stable unactuated sail. In this and other examples, normal sailing is accomplished with the sail 130 in one of two positions either to the port side or the starboard side of the autonomous sailing vessel 100. The actual sail position is generally limited to be within a predetermined angular range. Two mechanical stops engage with a portion of the sail 130 to define boundaries of the predetermined angular range. For example, an arm may extend from the sail 130 to a region bounded by the two mechanical stops, one to each side, and the sail 130 may rotate in one direction until the arm reaches and is stopped by one of the mechanical stops, or in the other direction until the arm reaches and is stopped by the other of the mechanical stops. In normal operation, the wind drives the sail 130 against one mechanical stop or the other depending on the direction of the wind relative to the autonomous sailing vessel 100. Usually, the port and starboard boundaries of the predetermined angular range are symmetric about the central axis of the autonomous sailing vessel 100, but this is neither essential nor required. For example, in a sailing vessel such as a proa with no plane of symmetry between the port side and the starboard side, the normal sailing position of the sail may be set differently on the port and the starboard sides.

After the sail 130 has been depowered due to excessive wind, it may be desirable to temporarily leave the sail 130 in a depowered state. Eventually average and peak wind speeds will be reduced to a level where the risk of overturning with the sail 130 in a powered state is minimal. The autonomous sailing vessel 100 may resume normal autonomous sailing after the wind speeds are sufficiently reduced. In this and other embodiments, the autonomous sailing vessel 100 may sense or be told that the wind conditions are now safe for normal sailing. In this and other examples, the autonomous sailing vessel 100 may measure wind direction or wind speed. Further, the autonomous sailing vessel with the sail 130 depowered may still move under the action of wind drag. Underwater control surfaces of the autonomous sailing vessel 100, such as the rudder 140, will cause the autonomous sailing vessel 100 to move generally forward or backward as the underwater control surfaces are aligned with the normal direction of travel of the autonomous sailing vessel 100. As such, the autonomous sailing vessel 100 may still have some ability to change its heading by changing the settings of the underwater control surfaces even when the sail 130 is depowered. The autonomous sailing vessel 100 may also be able to determine if it is moving generally forward or backward because the heading and the course will be generally aligned for forward motion and opposed for backward motion. Whether the autonomous sailing vessel 100 is moving forward or backward, moving the underwater control surfaces hard to port or starboard should cause the autonomous sailing vessel to rotate in the water. The direction the underwater control surfaces are moved may be determined so the autonomous sailing vessel 100 is moved to a position where the sail 130 is luffing but aligned in a normal sailing position. When the sail 130 passes from a depowered position to a powered position, the sail may be relatched automatically so its range of motion corresponds once again to normal autonomous sailing, e.g., so that the range of motion is within the predetermined angular range. Accordingly, the autonomous sailing vessel 100 may further include a sail relatch device configured to automatically relatch the sail 130 in a powered position. After the sail 130 is relatched, normal sailing may continue.

FIGS. 3A-3E illustrate an example sail release device 300 that may be implemented in the autonomous sailing vessels 100, 200 of FIGS. 1 and 2, arranged in accordance with at least one embodiment described herein. As illustrated, the sail release device 300 is coupled to a fixed structure 302 of an autonomous sailing vessel. The fixed structure 302 may include, be included in, or correspond to all or a portion of the connector structure 150 of FIG. 1 or may otherwise be fixed with respect to one or more hulls of an autonomous sailing vessel in which the sail release device 300 is implemented. FIGS. 3A-3E further illustrate a portion of a mast 304 mounted to the fixed structure 302 and a sail 306 rotatably coupled to the mast 304. The mast 304 and the sail 306 may respectively include, be included in, or correspond to the mast 120 and the sail 130 of FIG. 1.

Figure 3A:
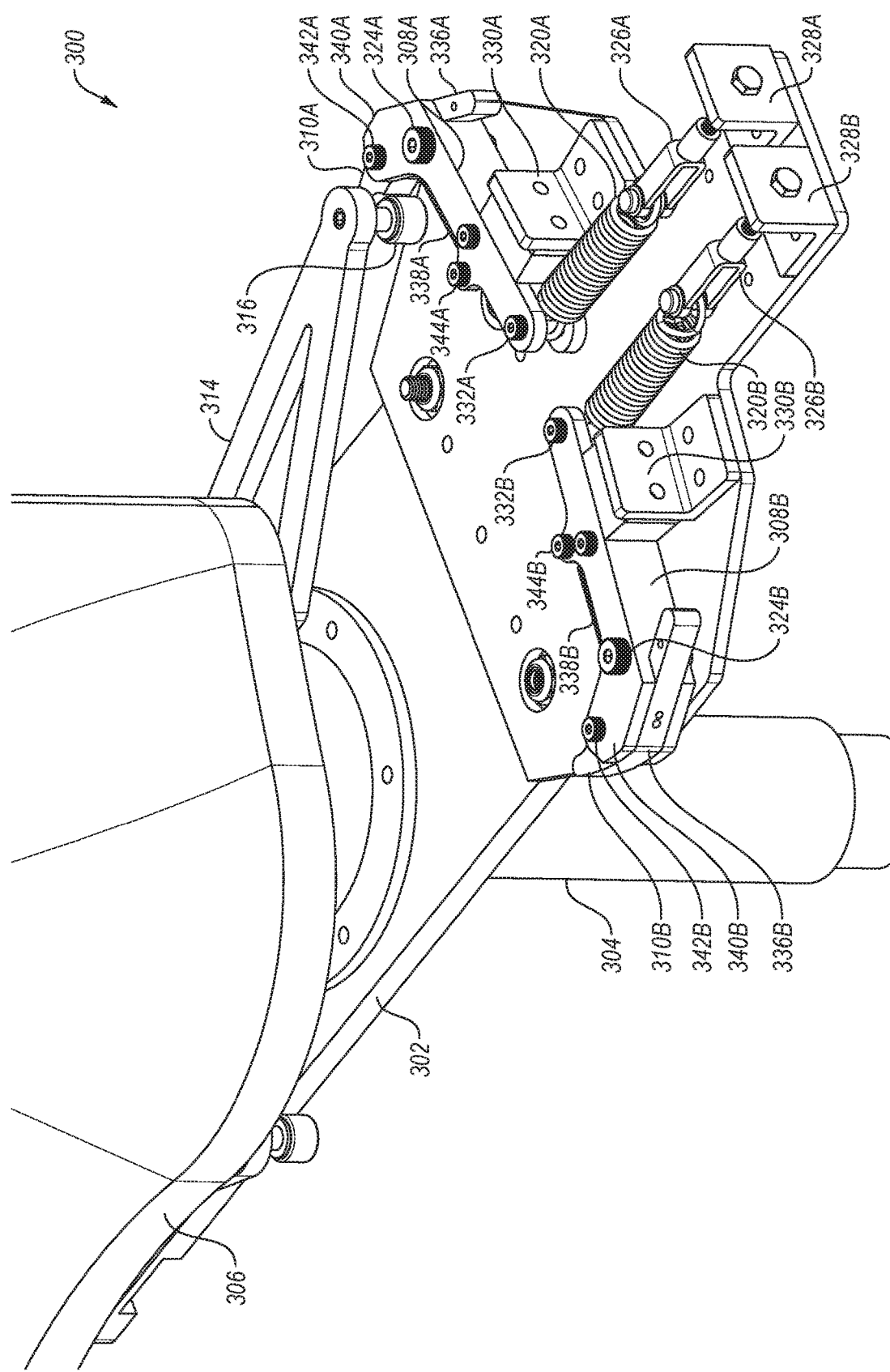
FIGS. 3A-3E illustrate an example sail release device that may be implemented in the autonomous sailing vessels of FIGS. 1 and 2.
Figure 3B:
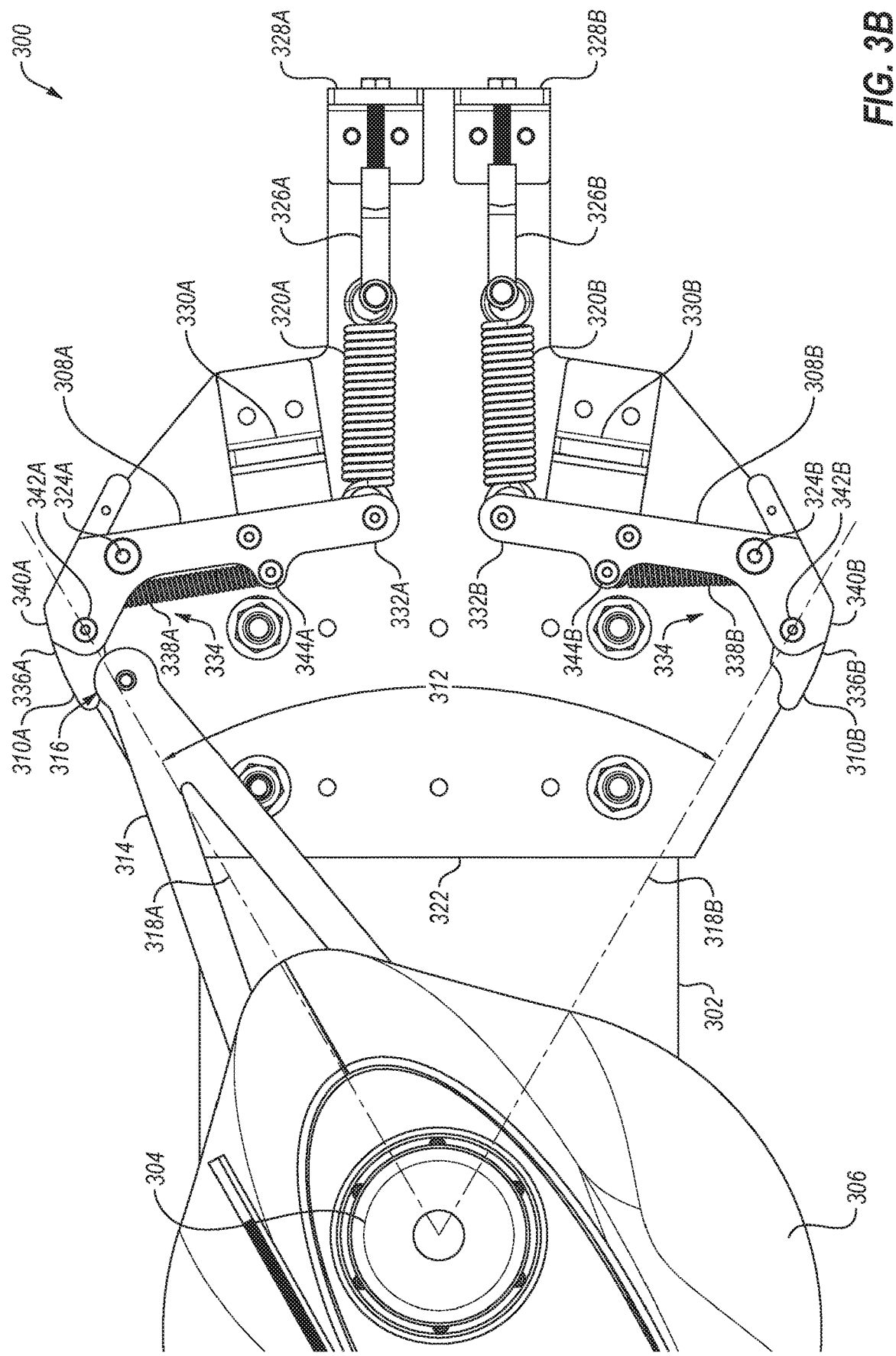

In general, the sail release device 300 includes one or more latch arms 308A, 308B (hereinafter generically "latch arm 308" or collectively "latch arms 308"), each with a mechanical stop 310A, 310B (hereinafter generically "stop 310" or collectively "stops 310") at an end thereof. During normal sailing absent excess wind, the stops 310 confine angular position of the sail 306 relative to the fixed structure 302 within a predetermined angular range 312 (FIG. 3B).

In more detail, the sail 306 includes a sail extension arm 314 that extends generally forward from the sail 306 during normal sailing. The sail extension arm 314 may be rigid or semi-rigid and may rotate with the sail 306 relative to the fixed structure 302. The sail extension arm 314 includes a post 316 that extends downward. The stops 310 engage with the post 316 to define boundaries 318A, 318B (FIG. 3B) (hereinafter generically "boundary 318" or collectively "boundaries 318") of the predetermined angular range 312. The stops 310 may have a cupped or other shape that may be complementary to a cylindrical or other shape of the post 316.

The sail 306 is generally free to rotate between the boundaries 318 defined by the stops 310 during normal sailing. The sail 306 is configured in a bistable arrangement in which, in operation, the sail 306 and the sail extension arm 314 is usually aligned parallel to one of the two boundaries 318 depending on the direction of the wind relative to the autonomous sailing vessel. For a port tack, the autonomous sailing vessel is oriented with the wind coming from the port side, causing the sail 306 to be oriented with the sail extension arm 314 parallel to the boundary 318A of the predetermined angular range 312 where the post 316 engages with the stop 310A as illustrated in FIGS. 3A and 3B. For a starboard tack, the autonomous sailing vessel is oriented with the wind coming from the starboard side, causing the sail 306 to be oriented with the sail extension arm 314 parallel to the boundary 318B of the predetermined angular range 312 where the post 316 engages with the stop 310B. Wind that has a component coming from the port side is referred to herein as port side wind, while wind that has a component coming from the starboard side is referred to herein as starboard side wind.

When the autonomous sailing vessel changes tack, e.g., from port tack to starboard tack or vice versa, the sail extension arm 314 and the post 316 may be driven by the wind on the sail 306 from one stop 310 to the other stop 310. Accordingly, some embodiments may include one or more damping devices to absorb kinetic energy and/or motion of the sail 306 to reduce the kinetic energy or angular speed of the sail 306 before reaching the stops 310 and/or before exceeding the boundaries 318. The damping device may generally include a linear or rotary energy absorbing device. For example, the damping device may include a linear dashpot, a hydraulic extensional damper, or other suitable damping device. Damping devices may be implemented with the configuration of FIGS. 3A-3E or other autonomous sailing vessel configurations.

The latch arms 308 may be spring-loaded and configured to automatically release the sail 306 responsive to excess wind on the sail 306 loading the latch arms 308 beyond a spill threshold. In this and other embodiments, the sail release device 300 further includes one or more latch arm springs 320A, 320B (hereinafter generically "latch arm spring 320" or collectively "latch arm springs 320"). The latch arm spring 320A spring loads the latch arm 308A while the latch arm spring 320B spring loads the latch arm 308B.

Figure 3C:
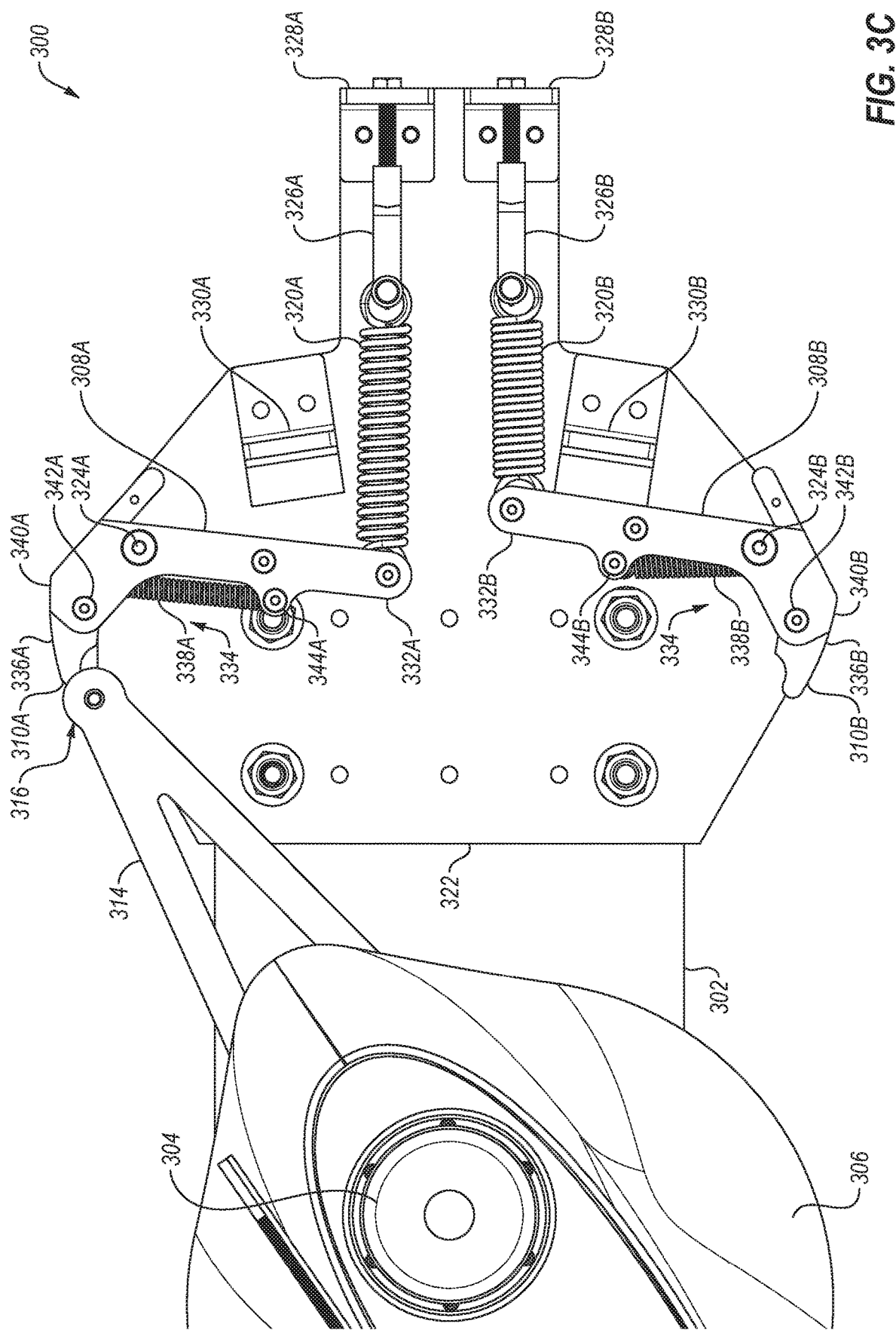

The sail release device 300 may further include a base plate 322 coupled to the fixed structure 302. Each of the latch arms 308 is rotatably coupled to the fixed structure 302 through a latch arm pivot 324A, 324B (hereinafter generically "latch arm pivot 324" or collectively "latch arm pivots 324") (and through the base plate 322). Each of the latch arms 308 is rotatable between a first latch position and a release position. FIGS. 3A, 3B, 3D, and 3E show the latch arms 308 in the first latch position and FIG. 3C shows the latch arm 308A in the release position.

The sail release device 300 may further include preloader assemblies 326A, 326B (hereinafter generically "preloader assembly 326" or collectively "preloader assemblies 326"), brackets 328A, 328B (hereinafter generically "bracket 328" or collectively "brackets 328"), and latch arm limiters 330A, 330B (hereinafter generically "latch arm limiter 330" or collectively "latch arm limiters 330"). Each latch arm spring 320 is coupled between a first end 332A, 332B (hereinafter generically "first end 332" or collectively "first ends 332") of the corresponding latch arm 308 and the fixed structure 302 through the corresponding preloader assembly 326, the corresponding bracket 328, and the base plate 322. The latch arm springs 320 may be preloaded, e.g., by adjusting set bolts included in the preloader assemblies 326 appropriately, to bias the latch arms 308 against the latch arm limiters 330.

The latch arms springs 320 are configured to resist rotation of the latch arms 308 from the first latch position to the release position. As illustrated, the latch arm springs 320 are arranged to operate in extension where the latch arm springs 320 resist rotation of the latch arms 308 in a direction that increases a length of the latch arm springs 320. In particular, clockwise rotation of the latch arm 308A from the first latch position to the release position causes the latch arm spring 320A to increase in length, e.g., stretch, and the latch arm spring 320A naturally resists stretching. Accordingly, the latch arm spring 320A resists clockwise rotation of the latch arm 308A about the latch arm pivot 324A from the first latch position to the release position. The latch arm spring 320B similarly resists counterclockwise rotation of the latch arm 308B about the latch arm pivot 324B from the first latch position to the release position. In other embodiments, the latch arm springs 320 may be arranged to operate in compression, e.g., an arrangement in which the latch arm springs 320B naturally resist compression, with appropriate rearrangement of parts of the sail release device 300.

Port side wind on the sail 306 urges the sail 306 counterclockwise, which in turns urges the post 316 (through the sail extension arm 314) against the stop 310A. The force of the post 316 on the stop 310A urges the latch arm 308A clockwise about the latch arm pivot 324A, while the latch arm spring 320A resists the clockwise rotation of the latch arm 308A about the latch arm pivot 324A. When the port side wind is excessive, e.g., beyond the spill threshold, the force of the post 316 on the stop 310A overcomes the resistance of the latch arm spring 320A to clockwise rotation of the latch arm 308A. As illustrated in FIG. 3C, when the resistance of the latch arm spring 320A is overcome, the latch arm 308A rotates clockwise sufficiently for the post 316 to clear the stop 310A, thereby releasing the sail 306 to spill the excess port side wind.

Similarly, starboard side wind on the sail 306 urges the sail 306 clockwise, which in turns urges the post 316 (through the sail extension arm 314) against the stop 310B. The force of the post 316 on the stop 310B urges the latch arm 308B counterclockwise about the latch arm pivot 324B, while the latch arm spring 320B resists the counterclockwise rotation of the latch arm 308B about the latch arm pivot 324B. When the starboard side wind is excessive, e.g., beyond the spill threshold, the force of the post 316 on the stop 310B overcomes the resistance of the latch arm spring 320B to counterclockwise rotation of the latch arm 308B. When the resistance of the latch arm spring 320B is overcome, the latch arm 308B rotates counterclockwise sufficiently for the post 316 to clear the stop 310B, thereby releasing the sail 306 to spill the excess starboard side wind.

After release of the sail 306 by the sail release device 300, the wind automatically repositions, e.g., rotates, the sail 306 to a position where the total wind force on the sail 306 is decreased significantly. For example, assume in FIG. 3C that the sail 306 is released in response to a port side wind with no fore-aft component, e.g., the wind is moving from the top to the bottom of the view of FIG. 3C. In this example, after the sail 306 is released, the sail 306 may rotate relative to the fixed structure 302 until the sail extension arm 314 is oriented directly into the wind, e.g., until the sail extension arm 314 is extending directly toward the top of FIG. 3C. In this orientation, the port side wind moves downward across FIG. 3C and a surface normal of the sail 306 is generally oriented perpendicular to the port side wind.

The spill threshold as used herein refers to a torque threshold or force threshold on a sail, such as the sail 306, that causes a corresponding sail release device, such as the sail release device 300, to automatically release the sail to spill excess wind.

In some embodiments, torque or force on the sail is measured by a sensor, relayed to a control unit, compared at the control unit to the spill threshold, and then the control unit commands the sail release device to release the sail to spill excess wind when the measurement exceeds the spill threshold.

In other embodiments, such as the example of FIGS. 3A-3E, the spill threshold is built into the sail release device. By way of example in FIGS. 3A-3E, the spill threshold may depend on, e.g., a spring constant or stiffness of the latch arm springs 320, an amount of preload of the latch arm springs 320, a distance between the latch arm pivot 324 and the first end 332 of the latch arm 308 where the latch arm spring 320 is coupled, or other configurable parameters of the sail release device 300. Accordingly, the spill threshold may be set to a desired value by appropriate configuration of the parameters of the sail release device 300. For example, providing the latch arm spring 320 with greater stiffness or preload may result in a higher spill threshold, thereby requiring greater force or torque from the wind before the sail 306 is automatically released. On the other hand, providing the latch arm spring 320 with less stiffness or preload may result in a lower spill threshold, thereby requiring less force or torque from the wind before the sail 306 is automatically released.

In some embodiments, the stiffness or preload of the latch arm springs 320 may be fixed during normal operation. In other embodiments, one or both of the stiffness or preload of the latch arm springs 320, and thus the spill threshold, may be adjustable during normal operation. It may be desirable to adjust the spill threshold depending on the speed of the autonomous sailing vessel through the water or depending on sensed or forecast wind speeds. If winds are steady and not gusty, some embodiments may adjust the spill threshold to a higher spill threshold for more effective sailing as it is usually peak gusts that result in excessive overturning moments. If the autonomous sailing vessel is sailing with higher-than-normal or lower-than-normal cargo, the overturning may in turn be lower-than-normal or higher-than-normal, respectively. Thus, depending on the current cargo weight, some embodiments may adjust the spill threshold, e.g., by adjusting the stiffness or preload. The disclosed embodiment includes translating springs, but rotational springs may alternatively be implemented.

The preloader assemblies 326 may be used to adjust the preload of the latch arm springs 320 and may be fixed during normal operation, e.g., prior to beginning a voyage. Alternatively, the preloader assemblies 326 may be actively controlled, e.g., by the control unit 205 of FIG. 2, such that the preload of the latch arm springs 320 may be adjusted during normal operation to automatically adjust the spill threshold. For example, an actuator may be operably coupled to the preloader assemblies 326 and the actuator may adjust the preloader assemblies 326 responsive to commands from the control unit to actively control the preload of the latch arm springs 320. Other mechanisms may be used to actively control the preload of the latch arm spring 320.

A stiffness of the latch arm springs 320 may depend on, e.g., a material composition of the latch arm springs 320. Accordingly, the selection of the material(s) used for the latch arm spring 320 may determine the stiffness of the latch arm spring 320. The stiffness may vary somewhat with environmental temperature fluctuations without being actively controlled.

FIGS. 3A-3E further illustrate an example sail relatch device 334 integrated with the sail release device 300. In other embodiments, the sail relatch device 334 may be separate from the sail release device 300. In general, the sail relatch device 334 may include one or more relatch arms 336A, 336B (hereinafter generically "relatch arm 336" or collectively "relatch arms 336") and one or more relatch arm springs 338A, 338B (hereinafter generically "relatch arm spring 338" or collectively "relatch arm springs 338"). The sail relatch device 334 may generally be configured to relatch the sail 306 in a powered position responsive to rotation of the sail 306 from the depowered position to the powered position.

Each relatch arm 336 is rotatably coupled to a second end 340A, 340B (hereinafter generically "second end 340" or collectively "second ends 340") of the corresponding latch arm 308 through a corresponding relatch arm pivot 342A, 342B (hereinafter generically "relatch arm pivot 342" or collectively "relatch arm pivots 342"). Each relatch arm 336 includes a corresponding one of the stops 310. Accordingly, the relatch arms 336 including the stops 310 may cooperate with the latch arms 308 to retain the sail 306 in a powered position absent excess wind. The powered position of the sail 306 may include a position of the sail 306 within the predetermined angular range 312 between the boundaries 318 such as either of the positions of the sail 306 in which the post 316 is against a corresponding one of the stops 310.

The relatch arms 336 are rotatable relative to the latch arms 308 between a second latched position and a relatch position. FIGS. 3A-3D show the relatch arms 336 in the second latch position and FIG. 3E shows the relatch arm 336A in the relatch position.

The relatch arm springs 338 may spring load the relatch arms 336. In particular, the relatch arm spring 338A spring loads the relatch arm 336A while relatch arm spring 338B spring loads the relatch arm 336B. Each relatch arm spring 338 is coupled between the corresponding relatch arm 336 and a corresponding spring mount 344A, 344B (hereinafter generically "spring mount 344" or collectively "spring mounts 344") on the corresponding latch arm 308. The relatch arm springs 338 may be preloaded, e.g., by configuring a distance between the relatch arm 336 and the spring mount 344 to be greater (or less) than an unloaded length of the relatch arm spring 338 such that the relatch arm spring 338 is stretch (or compressed) when the relatch arm 336 is in the second latch position. Alternatively or additionally, preloader assemblies similar to preloader assemblies 326 may be provided to set and adjust preload of the relatch arm springs 338.

The relatch arms springs 338 are configured to resist rotation of the relatch arms 336 from the second latch position to the relatch position. As illustrated, the relatch arm springs 338 are arranged to operate in extension where the relatch arm springs 338 resist rotation of the relatch arms 336 in a direction that increases a length of the relatch arm springs 338. In particular, counterclockwise rotation of the relatch arm 336A from the second latch position to the relatch position causes the relatch arm spring 338A to increase in length, e.g., stretch, and the relatch arm spring 338A naturally resists stretching. Accordingly, the relatch arm spring 338A resists counterclockwise rotation of the relatch arm 336A about the relatch arm pivot 342A from the second latch position to the relatch position. The latch arm spring 338B similarly resists clockwise rotation of the relatch arm 336B about the relatch arm pivot 342B from the second latch position to the relatch position. In other embodiments, the relatch arm springs 338 may be arranged to operate in compression, e.g., an arrangement in which the relatch arm springs 338B naturally resist compression, with appropriate rearrangement of parts of the sail relatch device 334.

After the sail 306 is released and is located outside the predetermined angular range 312, the sail 306 may be relatched by rotating the sail 306 relative to the fixed structure 302 so that the post 316 engages an outside of the stop 310 with sufficient force to overcome resistance of the relatch arm spring 338. When the resistance of the relatch arm spring 338 is overcome, the post 316 rotates the relatch arm 336 inward until the relatch arm 336 reaches the relatch position and the post 316 clears the relatch arm 336. After the relatch arm 336 is cleared, the relatch arm spring 338 returns the relatch arm 336 to the second latch position to confine the sail 306 within the predetermined angular range 312.

Figure 3D:
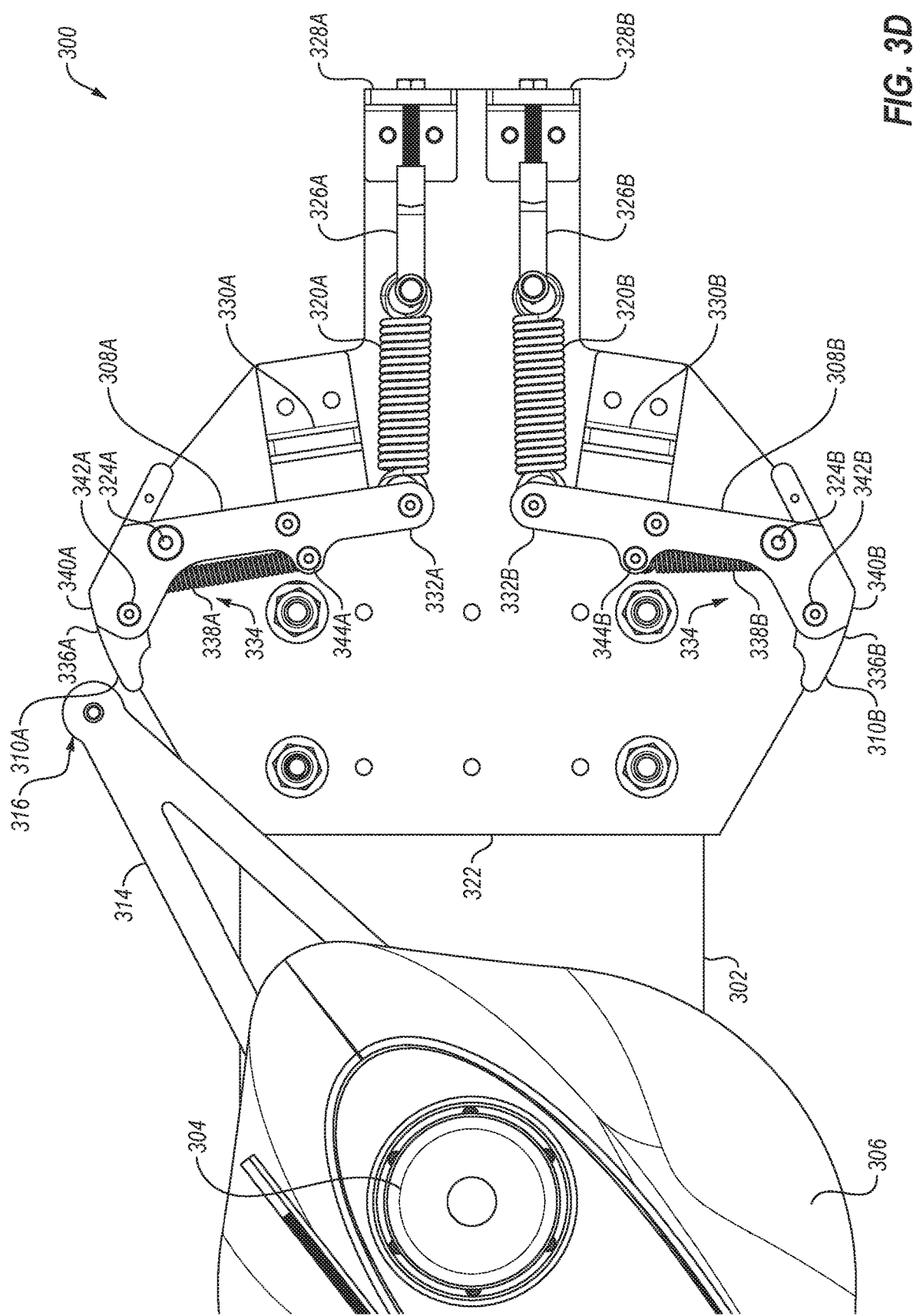
Figure 3E:
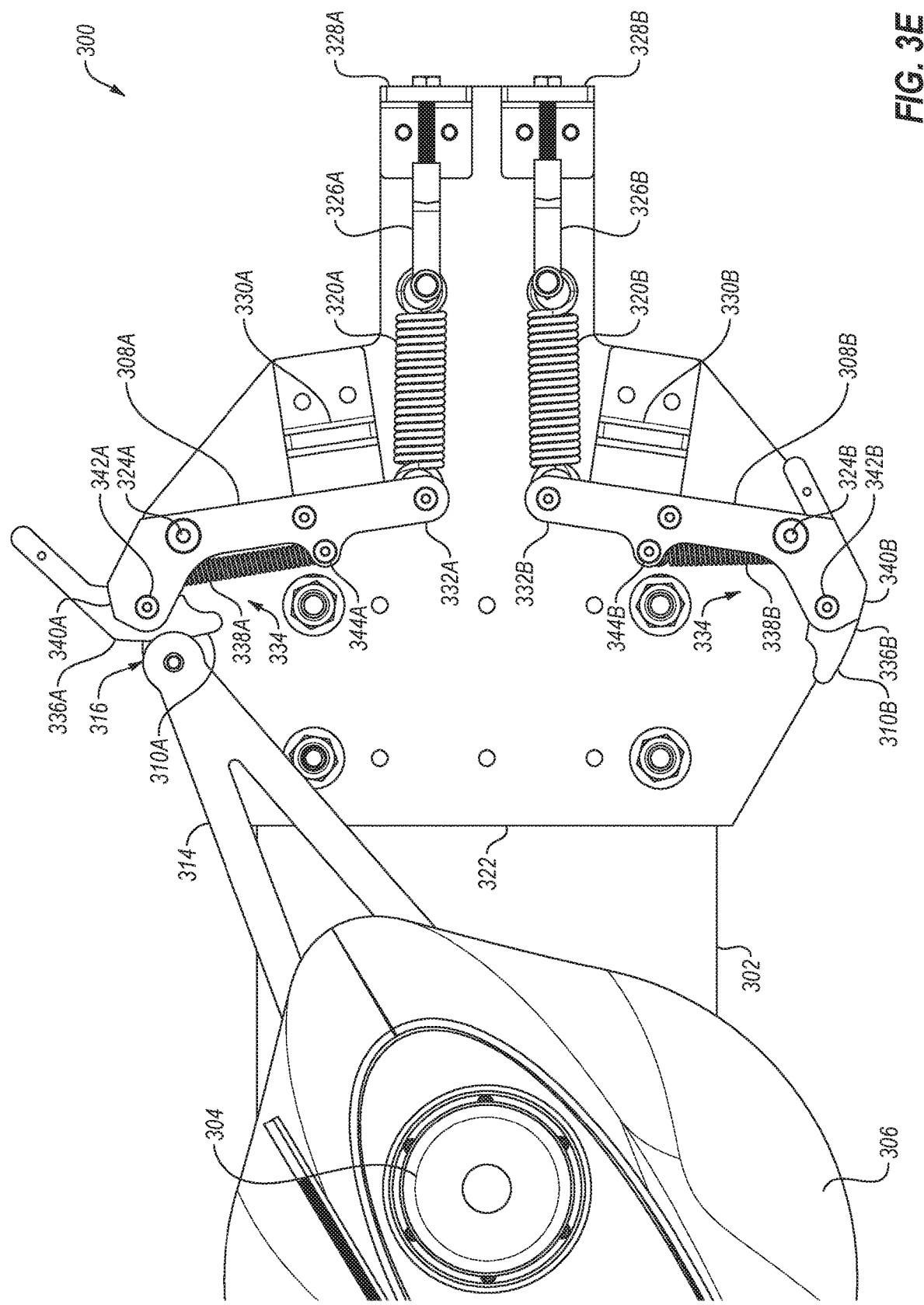

As a specific example, consider FIG. 3D in which the sail 306 has been released so that the post 316 is just outside the boundary 318A defined by the stop 310A/relatch arm 336A. It is apparent from FIG. 3D that when the sail 306 is in this orientation with respect to the fixed structure 302, a starboard side wind may rotate the sail 306 clockwise so that the post 316 urges against the outside of the post 310A/relatch arm 336A. The force of the post 316 on the outside of the stop 310A/relatch arm 336A urges the relatch arm 336A counterclockwise about the relatch arm pivot 342A, while the relatch arm spring 338A resists the counterclockwise rotation of the relatch arm 336A about the relatch arm pivot 342A. When the starboard side wind is sufficient, e.g., beyound a relatch threshold, the force of the post 316 on the outside of the stop 310A/relatch arm 336A overcomes the resistance of the relatch arm spring 338A to counterclockwise rotation of the relatch arm 336A. As illustrated in FIG. 3E, when the resistance of the relatch arm spring 338A is overcome, the relatch arm 336A rotates counterclockwise sufficiently for the post 316 to clear the stop 310A/relatch arm 336A, thereby relatching the sail 306 within the predetermined angular range 312.

As another specific example, consider an example (not shown) in which the sail 306 has been released so that the post 316 is just outside the boundary 318B defined by the stop 310B/relatch arm 336B. It is apparent from FIGS. 3A-3E that when the sail 306 is in this orientation with respect to the fixed structure 302, a port side wind may rotate the sail 306 counterclockwise so that the post 316 urges against the outside of the post 310B/relatch arm 336B. The force of the post 316 on the outside of the stop 310B/relatch arm 336B urges the relatch arm 336B clockwise about the relatch arm pivot 342B, while the relatch arm spring 338B resists the clockwise rotation of the relatch arm 336B about the relatch arm pivot 342B. When the port side wind is sufficient, e.g., beyond the relatch threshold, the force of the post 316 on the outside of the stop 310B/relatch arm 336B overcomes the resistance of the relatch arm spring 338B to clockwise rotation of the relatch arm 336B. When the resistance of the relatch arm spring 338B is overcome, the relatch arm 336B rotates clockwise sufficiently for the post 316 to clear the stop 310B/relatch arm 336B, thereby relatching the sail 306 within the predetermined angular range 312.

The relatch threshold as used herein refers to a torque threshold or force threshold on a sail, such as the sail 306, that causes a corresponding sail relatch device, such as the sail relatch device 334, to automatically relatch the sail as the sail is moved from a depowered position toward a powered position within a predetermined angular range.

The relatch threshold may be built into the sail relatch device. By way of example in FIGS. 3A-3E, the relatch threshold may depend on, e.g., a spring constant or stiffness of the relatch arm springs 338, an amount of preload of the relatch arm springs 338, a distance between the relatch arm pivot 342 and the location on the relatch arm 336 where the relatch arm spring 338 is coupled, or other configurable parameters of the sail relatch device 334. Accordingly, the relatch threshold may be set to a desired value by appropriate configuration of the parameters of the sail relatch device 334. The stiffness, preload, or other parameters of the sail relatch device 334 that determine the relatch threshold may be fixed or adjustable, e.g., analogously as described with respect to the sail release device 300.

In general, the relatch threshold may be configured to be relatively low. The relatch threshold may generally be high enough that the relatch arm springs 338 can rotate the relatch arms 336 from the relatch position to the second latch position while being sufficiently low that relatively little wind can rotate the sail 306 through the sail relatch device 334 from the depowered state to the powered state. In this and other embodiments, the resistance of the relatch arm springs 338 (and thus the relatch threshold) to rotation of the relatch arms 336 from the second latch position to the relatch position is significantly less than the resistance of the latch arm springs 320 (and thus the spill threshold) to rotation of the latch arms 308 from the first latch position to the release position.

The sail 306 may be rotated into a suitable position to relatch by, e.g., controlling underwater control surfaces of the autonomous sailing vessel to steer the autonomous sailing vessel into an orientation relative to the wind whereby the wind urges the sail 306 in the desired direction. As described above, for instance, the autonomous sailing vessel may measure wind direction or wind speed and with the sail 306 in a depowered state the autonomous sailing vessel may still move under the action of wind drag. The underwater control surfaces of the autonomous sailing vessel, such as a rudder, cause the autonomous sailing vessel to move generally forward or backward as the underwater control surfaces are aligned with the normal direction of travel of the autonomous sailing vessel. The autonomous sailing vessel may thereby have some ability to change its heading by changing the settings of the underwater control surfaces even when the sail is depowered. In particularly, while the autonomous sailing vessel is in motion under the action of wind drag, the rudder can be turned hard to port or starboard to cause the autonomous sailing vessel to rotate into a suitable orientation with respect to the wind. In this manner, the autonomous sailing vessel may steer into a desired position relative to the wind whereby the wind may urge the sail 306 in the depowered state toward the powered state.

At any desired time, the control unit of the autonomous sailing vessel may determine whether the sail 306 is in a powered or depowered position. For example, the control unit can make rudder (or other underwater control surface) adjustments and analyze measurements from one or more sensors to determine whether the response of the autonomous sailing vessel is indicative of the sail 306 being in powered or depowered position.

In embodiments in which sail position is actively controlled and the sail release device is implemented in-line with the sailing-position actuator, the sail relatch device may similarly be implemented in-line with the sailing-position actuator. In this and other embodiments, normal sailing position changes of the sail may be accomplished by changing the actuator position. Excessive wind loads on the sail and the actuator may be spilled by unlatching or releasing the sail from the actuator. In this way, the response of the sail release device may be very fast and may react to fast-changing wind speeds while the response of the sail-positioning actuator may be much slower and may react to normal wind shifts during sailing. When the autonomous sailing vessel's control unit determines that is safe to resume normal sailing, the control unit may move the actuator to relatch the sail.

In some embodiments, autonomous sailing vessels traveling in densely traveled waterways may be towed by a powered vessel, e.g., when the autonomous sailing vessel is leaving or returning to a marina or harbor and is not in open water. Alternatively or additionally, autonomous sailing vessels may be temporarily manned under similar or other circumstances. Accordingly, some embodiments herein may include a manual sail release device that may be manually operated by a user to spill excess wind, e.g., while manning/navigating the vessel in dense traffic. The manual sail release device may be operably coupled to the sail 306 and may be configured to release the sail 306 from the powered position to the depowered position responsive to manual operation of the manual sail release device by a user. The manual sail release device may be integrated with the sail release device 300 or the sail relatch device 334 or may be independent therefrom. An example manual sail release device may include the sail release device 300 operated manually. For example, a user may manually rotate the relatch arm 336 about the relatch arm pivot 342 to move the stop 310 out of the way of the post 316, thereby allowing the sail 306 to move from a powered position to a depowered position.

Embodiments of sail release devices described herein may include a translating mechanism that by unlatching allows large scale rotation of a sail to reduce wind forces on the sail. Embodiments described herein are not limited to only such devices. Other embodiments may directly apply a torque about the sail's rotation axis to affect a large-scale position change in response to sensed excessive forces on the sail. For example, a chain-and-sprocket or a pulley-and-sheave or a set of interlocking gears may translate rotational motion of the sail into rotational motion of a stop device. As a specific example, a rotary clutch may be released when the wind-induced torque on the clutch exceeds the spill threshold.

In some examples, the autonomous sailing vessels descried herein may include one or more mechanical stops coupled to a fixed structure of the autonomous sailing vessel. These mechanical stops may be different than the mechanical stops, such as stops 310, the define boundaries of the predetermined angular range of motion of the sail. Instead, these mechanical stops may be positioned to prevent rotation of the sail beyond a predetermined angular position outside of the predetermined angular range, e.g., after automatic release by the sail release device. Such mechanical stops may prevent full circular rotation of the sail, which may be desirable if there are instruments in the sail electrically wired without a slip ring into the main part of the autonomous sailing vessel. This second set of stops may be positioned such that when the sail is against these stops, the sail does not encounter significant wind loads that may result in an unwanted overturning wind load.

Sail release devices and/or sail relatch devices may be implemented in autonomous sailing vessels with one or more sails, where each sail has one or more elements. Where a sail has multiple elements, such as the fore sail element 130A and the aft sail element 130B of the sail 130 of FIG. 1, sailing efficiency can be improved by appropriate control of and adjustments to a relative angle between the fore and after sail elements, also referred to as the camber angle. In particular, a higher camber two-element sail may generate significantly more lift than a zero camber two-element sail or a single element sail. To generate this increased lift on either a port or a starboard tack, the camber angle of the sail must change sign from one tack to the next.

In some embodiments, the camber angle may be automatically changed by a camber control assembly that is coupled to the overall motion of the sail. An example camber control assembly that may be implemented in the autonomous sailing vessels 100, 200 of FIGS. 1 and 2 may include a camber actuator operatively coupled to or between one or both of the fore sail element 130A and the aft sail element 130B. A control unit of the autonomous sailing vessel may send commands to the camber actuator to set the camber angle.

Figure 4:
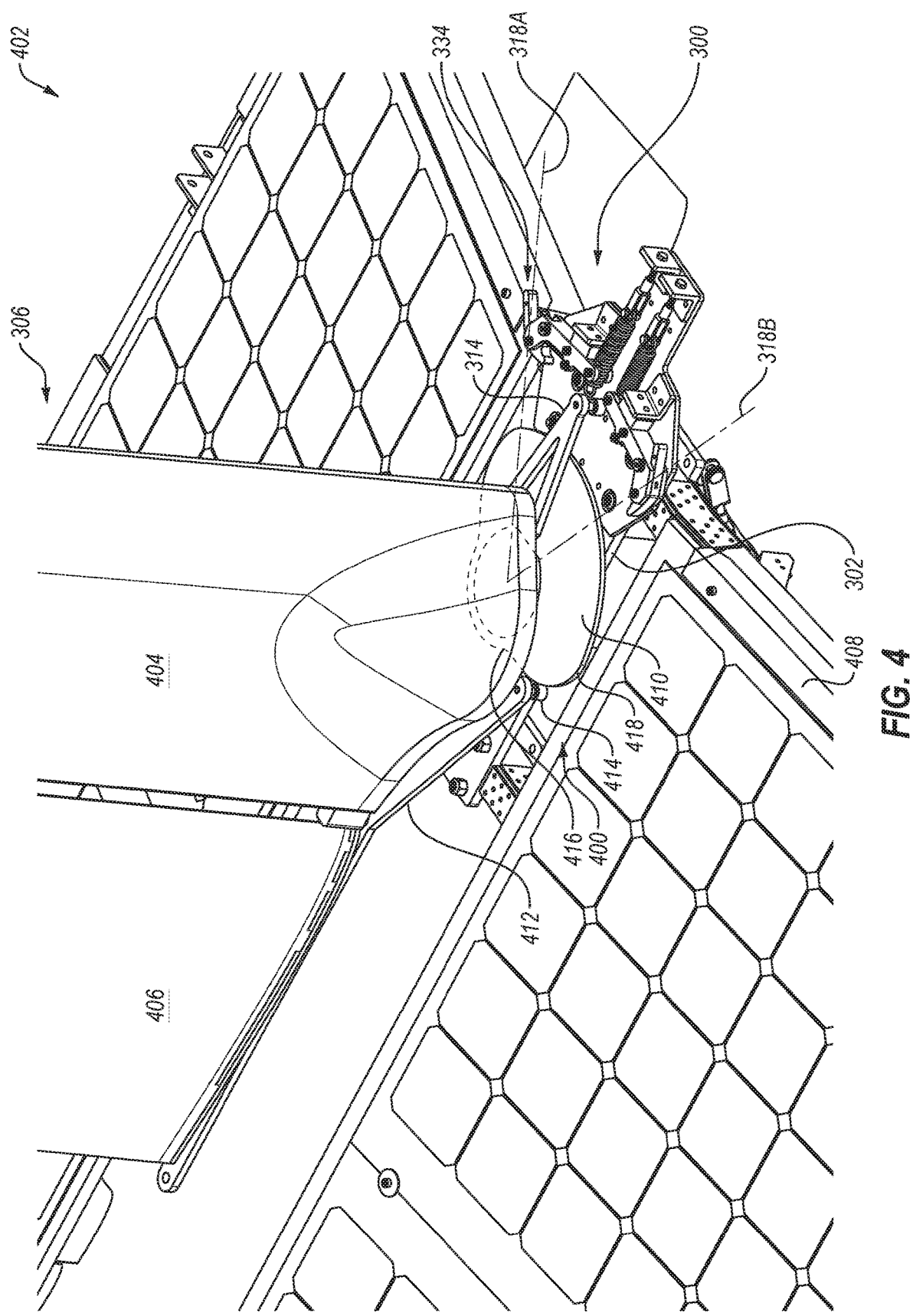
FIG. 4 illustrates an example camber control assembly that may be implemented in the autonomous sailing vessels of FIGS. 1 and 2.

FIG. 4 illustrates another example camber control assembly 400 that may be implemented in the autonomous sailing vessels 100, 200 of FIGS. 1 and 2, arranged in accordance with at least one embodiment described herein. The camber control assembly 400 of FIG. 4 may be implemented together with or independently of a sail release device or sail relatch device.

As illustrated in FIG. 4, the camber control assembly 400 is implemented in an autonomous sailing vessel 402 that includes some elements of FIGS. 3A-3E, including the sail 306, the fixed structure 302, the sail release device 300, and the sail relatch device 334. The sail 306 includes both a fore sail element 404 and an aft sail element 406. The autonomous sailing vessel 402 further includes a connector structure 408 that includes or is coupled to the fixed structure 302, as well as various other components such as one or more of those components described with respect to FIGS. 1-3E. For example, although not visible in FIG. 4, the autonomous sailing vessel may include the mast 304 of FIG. 3A that is coupled to one or more hulls of the autonomous sailing vessel 402, where the sail 306 is coupled to the mast.

The fore sail element 404 may be rotatably coupled at a fore of the fore sail element 404 to the mast. The aft sail element 406 may be rotatably coupled at a fore of the aft sail element 406 to an aft of the fore sail element 404. The camber control assembly 400 may be configured to automatically set a camber angle between the fore sail element 404 and the aft sail element 406 based on a position of the fore sail element relative to the fixed structure 302 to which the mast is coupled.

The camber control assembly 400 may include a camber control cam 410, a camber control arm 412, and a cam follower 414. A portion of the camber control cam 410 is not visible behind the sail 306 in the view of FIG. 4, but an outline of the obscured portion of the camber control cam 410 is overlaid on the sail 306 to illustrate a shape of the camber control cam 410. The camber control cam 410 may be coupled to the fixed structure 302 of the autonomous sailing vessel and may remain fixed with respect to the fixed structure 302 when the sail 306 rotates.

The fore sail element 404 and the aft sail element 406 are rotatably coupled together by one or more hinges 416, only one of which is visible in the view of FIG. 4. The camber control arm 412 is coupled to the aft sail element 406 and is configured to rotate with the aft sail element 406 relative to the fore sail element 404. As the fore sail element 404 rotates about its rotation axis relative to, e.g., the fixed structure 302, the camber angle of the fore sail element 404 and the aft sail element 406 may be automatically set to a specified value determined by a geometry of the camber control cam 410 and the camber control arm 412.

For example, suppose the fore sail element 404 rotates clockwise relative to the fixed structure 302 from the neutral position illustrated in FIG. 4 to the powered position in which the sail extension arm 314 is parallel to the boundary 318B under action of starboard side wind. As the fore sail element 404 rotates clockwise toward the powered position, the camber angle will vary as the cam follower 414 follows the cam face of the camber control cam 410. When the fore sail element 404 reaches the powered position parallel to the boundary 318B, the cam follower 414 may approximately reach a dip 416 on the edge of the camber control cam 410 that brings the cam follower 414 closer to the rotational axis of the fore sail element 404 than when the fore sail element 404 is in the neutral position. Because the cam follower 414 is rigidly connected to the aft sail element 406 through the camber control arm 412, the clockwise rotation of the fore sail element 404 to the powered position parallel to the boundary 318B brings the cam follower 414 closer to the rotational axis of the fore sail element 404, causing the aft sail element 406 to rotate counterclockwise relative to the fore sail element 404 and resulting in the sail 306 presenting a generally convex surface to the port side wind.

As another example, suppose the fore sail element 404 rotates counterclockwise relative to the fixed structure 302 from the neutral position illustrated in FIG. 4 to the powered position in which the sail extension arm 314 is parallel to the boundary 318A under action of port side wind. As the fore sail element 404 rotates counterclockwise toward the powered position, the camber angle will vary as the cam follower 414 follows the cam face of the camber control cam 410. When the fore sail element 404 reaches the powered position parallel to the boundary 318A, the cam follower 414 may approximately reach a point 418 on the edge of the camber control cam 410 that brings the cam follower 414 further from the rotational axis of the fore sail element 404 than when the fore sail element 404 is in the neutral position. Because the cam follower 414 is rigidly connected to the aft sail element 406 through the camber control arm 412, the counterclockwise rotation of the fore sail element 404 to the powered position parallel to the boundary 318A brings the cam follower 414 further from the rotational axis of the fore sail element 404, causing the aft sail element 406 to rotate clockwise relative to the fore sail element 404 and resulting in the sail 306 presenting a generally convex surface to the starboard side wind.

For simplicity, only one cam face (e.g., the cam face of the camber control cam 410) is illustrated in FIG. 4 generally forward of the cam follower 414. In some embodiments, a second cam face, e.g., of a second camber control cam, may be provided that extends generally parallel to the cam face of the camber control cam 410. The cam face of the camber control cam 410 and the second cam face of the second camber control cam may cooperate to bidirectionally constrain the cam follower 414 to a path between the two cam faces that follows the curvature of the two cam faces.

Figure 5A:
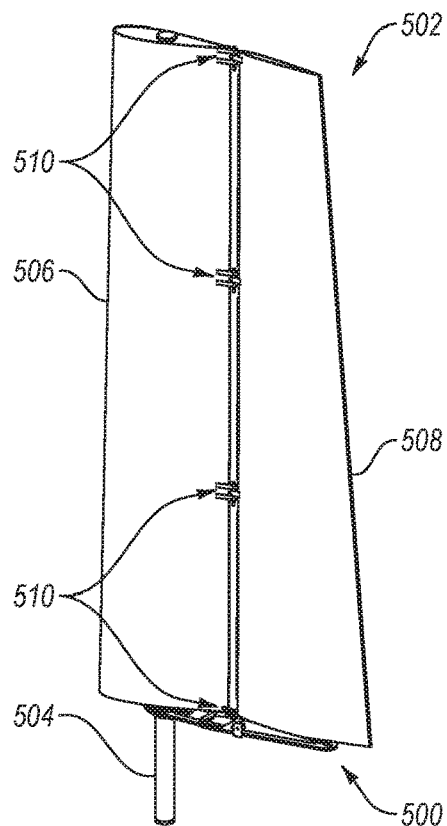
FIGS. 5A and 5B illustrate another example camber control assembly that may be implemented in the autonomous sailing vessels of FIGS. 1 and 2.
Figure 5B:
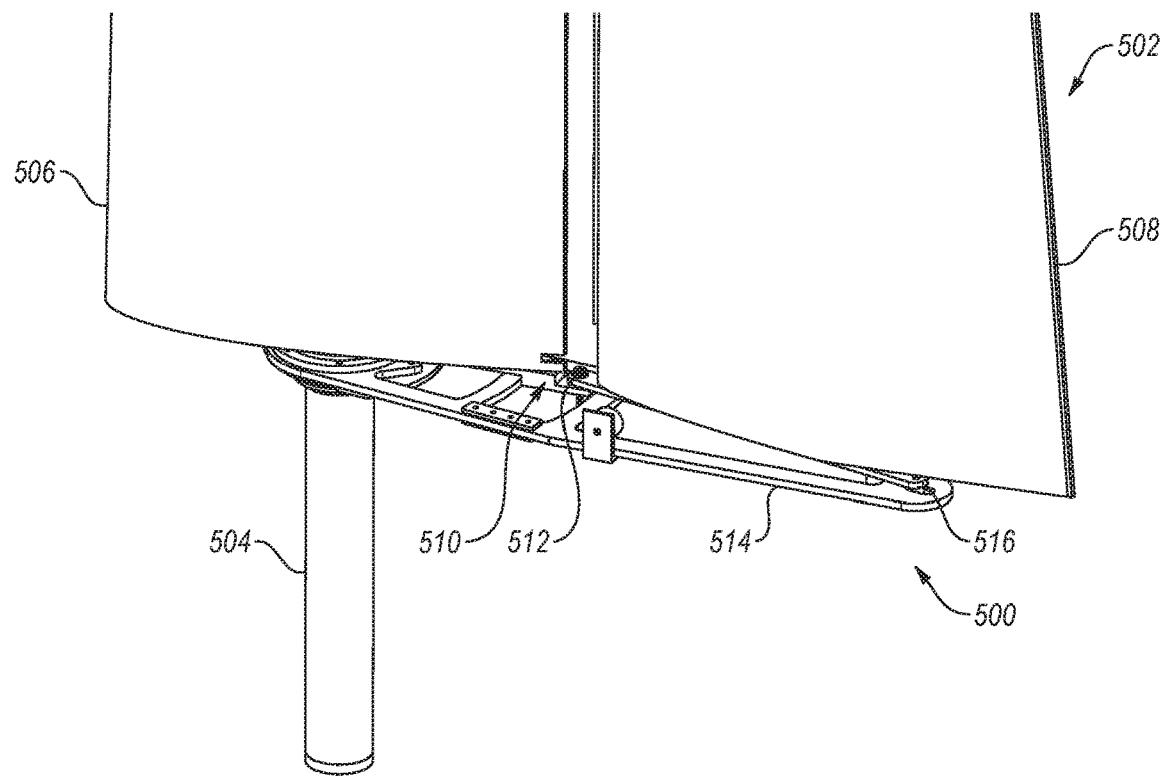

FIGS. 5A and 5B illustrate another example camber control assembly 500 that may be implemented in the autonomous sailing vessels 100, 200 of FIGS. 1 and 2, arranged in accordance with at least one embodiment described herein. The camber control assembly 500 of FIG. 5 may be implemented together with or independently of a sail release device or sail relatch device.

The camber control assembly 500 may be implemented in an autonomous sailing vessel that includes a sail 502, a mast 504, and various other components such as one or more of the components described with respect to FIGS. 1-4, including one or more hulls, a connector structure, a fixed structure, a control unit, a sail release device, a sail relatch device, or other components. The sail 502 is mechanically coupled to the mast 504 and the mast 504 may be mechanically coupled to the fixed structure.

As illustrated, the sail 502 includes a fore sail element 506 rotatably coupled to the mast 504 and an aft sail element 508 rotatably coupled at a fore of the aft sail element 508 to an aft of the fore sail element 506. The fore sail element 506 and the aft sail element 508 are rotatably coupled together by one or more hinges 510. The bottom hinge 510 includes a hinge pin 512. The camber control assembly 500 is generally configured to automatically set the camber angle between the fore sail element 506 and the aft sail element 508. The camber control assembly 500 may automatically set the camber angle based on a position of the fore sail element 506 relative to the fixed structure of the autonomous sailing vessel.

The camber control assembly 500 may include a camber control boom 514, the hinge pin 512, and an aft pin 516. The camber control boom 514 may be mechanically or rotatably coupled to the mast 504. The camber angle may be automatically controlled by automatically constraining movement of the hinge pin 512 relative to the camber control boom 514 as described in more detail below.

Figure 6:
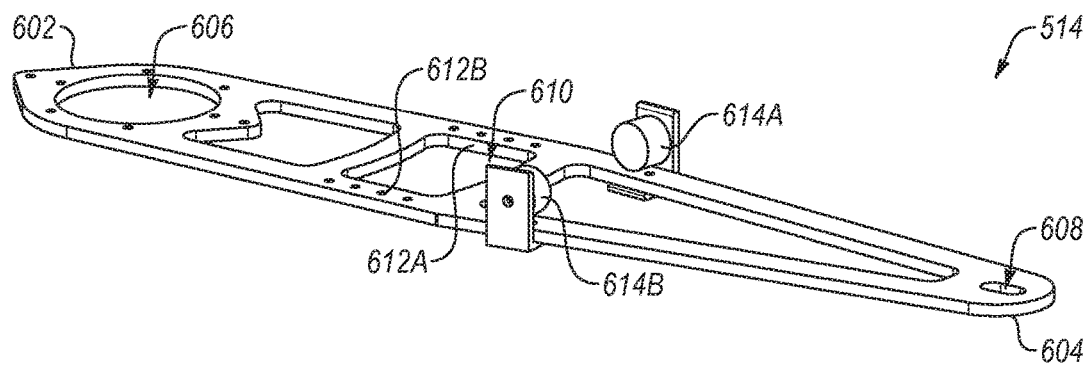
FIG. 6 illustrates a camber control boom of the camber control assembly of FIGS. 5A and 5B.

FIG. 6 illustrates the camber control boom 514 of FIGS. 5A and 5B, arranged in accordance with at least one embodiment described herein. The camber control boom 514 includes a fore end 602 and an aft end 604. The fore end 602 defines a mast opening 606 and the aft end 604 defines an aft slot 608. Between the fore end 602 and the aft end 604, the camber control boom 514 further defines a camber control opening 610.

The mast opening 606 is configured to receive therethrough the mast of the autonomous sailing vessel.

With combined reference to FIGS. 5B and 6, the camber control opening 610 is positioned relative to the sail 502 to receive a portion of the hinge pin 512. In particular, the hinge pin 512 may extend downward from the hinge 510 into the camber control opening 610 as illustrated in FIG. 5B.

The camber control opening 610 includes first camber control stops 612A, 612B (hereinafter generically "first camber control stop 612" or collectively "first camber control stops 612") on opposing walls of the camber control opening 610. The camber control opening 610, and specifically the first camber control stops 612, may be configured to confine rotational motion of the hinge pin 512, and thus of the hinge 510, about the mast 504 and relative to the camber control boom 514 within a predetermined angular range provided the aft pin 516 is movably coupled to the aft end 604 of the camber control boom 514. Accordingly, the aft slot 608 may be configured to receive a portion of the aft pin 516. In particular, the aft pin 516 may extend downward from the aft sail element 508 into the aft slot 608 as illustrated in FIG. 5B.

In general, the fore end 602 of the camber control boom 514 may rotate concentrically with the rotation axis of the fore sail element 506, e.g., on bearings coaxial with mast opening 606. The aft end 604 of the camber control boom 514 is attached to the aft end of the aft sail element 508, e.g., through interaction of the aft pin 516 with the aft slot 608. The sail 502 rotates about the mast 504. The sail 502 is configured to flex at the hinge 510. The range of motion of this flex, e.g., the flex range or camber angle range, is constrained by the first camber control stops 612 of the camber control opening 610 or other camber control stops of the camber control boom 514, such as second camber control stops 614A, 614B (hereinafter generically "second camber control stop 614" or collectively "second camber control stops 614") that extend upward from a top of the camber control boom 514.

For example, referring to FIGS. 5B and 6, when the fore sail element 506 rotates counterclockwise about the mast under action of port side wind, the hinge 510 and the hinge pin 512 also move counterclockwise about the mast until the hinge pin 512 engages the first camber control stop 612A and/or until a starboard side of the aft sail element 508 engages the second camber control stop 614A. Because the aft end of the aft sail element 508 is constrained to the aft end 604 of the camber control boom 514, the foregoing motion of the fore sail element 506 causes the aft sail element 508 to rotate clockwise about the aft pin 516. The constrained motion of both the fore sail element 506 and the aft sail element 508 arising from interaction of the hinge pin 512, the aft sail element 508, and/or the aft pin 516 with the camber control opening 610, the first camber control stop 612A, the second camber control stop 614A, and/or the aft slot 608 results in a high lift camber angle facing port side.

As another example, when the fore sail element 506 rotates clockwise about the mast under action of starboard side wind, the hinge 510 and the hinge pin 512 also move clockwise until the hinge pin 512 engages the first camber control stop 612B and/or until a port side of the aft sail element 508 engages the second camber control stop 614B. Because the aft end of the aft sail element 508 is constrained to the aft end 604 of the camber control boom 514, the foregoing motion of the fore sail element 506 causes the aft sail element 508 to rotate counterclockwise about the aft pin 516. The constrained motion of both the fore sail element 506 and the aft sail element 508 arising from interaction of the hinge pin 512, the aft sail element 508, and/or the aft pin 516 with the camber control opening 610, the first camber control stop 612B, the second camber control stop 614B, and/or the aft slot 608 results in a high lift camber angle facing starboard side.

Changes in camber angle cause foreshortening of the distance from the rotational axis of the fore sail element 506 and the aft end of the aft sail element 508. As such, the aft slot 608 may allow some motion of the aft pin 516 along the longitudinal axis of the camber control boom 514. Other arrangements may be possible.

FIGS. 5A-6 illustrate two example configurations of a camber control assembly to control camber angle. The first example configuration includes the hinge pin 512 that extends downward below bottoms of the fore and aft sail elements 506, 508 to engage with the first camber control stops 612 to limit the flex range (e.g., the camber angle range) of the sail 502. The second example configuration includes the second camber control stops 614 that extend upward from the top of the camber control boom 514 to engage with the port and starboard sides of the aft sail element 508 to limit the flex range of the sail 502. Other configurations are possible. For example, the second camber control stops 614 may alternatively extend upward from the camber control boom 514 at a location forward of the camber control opening 610 such that they engage with port and starboard sides of the fore sail element 506 to limit the flex range of the sail 502. More generally, camber control assemblies described herein may include any symmetrical feature pair (e.g., first camber control stops 612 or second camber control stops 614) coupled to, included in, extending from, or otherwise fixed with respect to the camber control boom 514 and positioned to engage a corresponding feature or features coupled to, included in, extending from, or otherwise fixed with respect to the fore sail element 506 or the aft sail element 508 to limit the flex range of the sail 502.

Figure 7A:
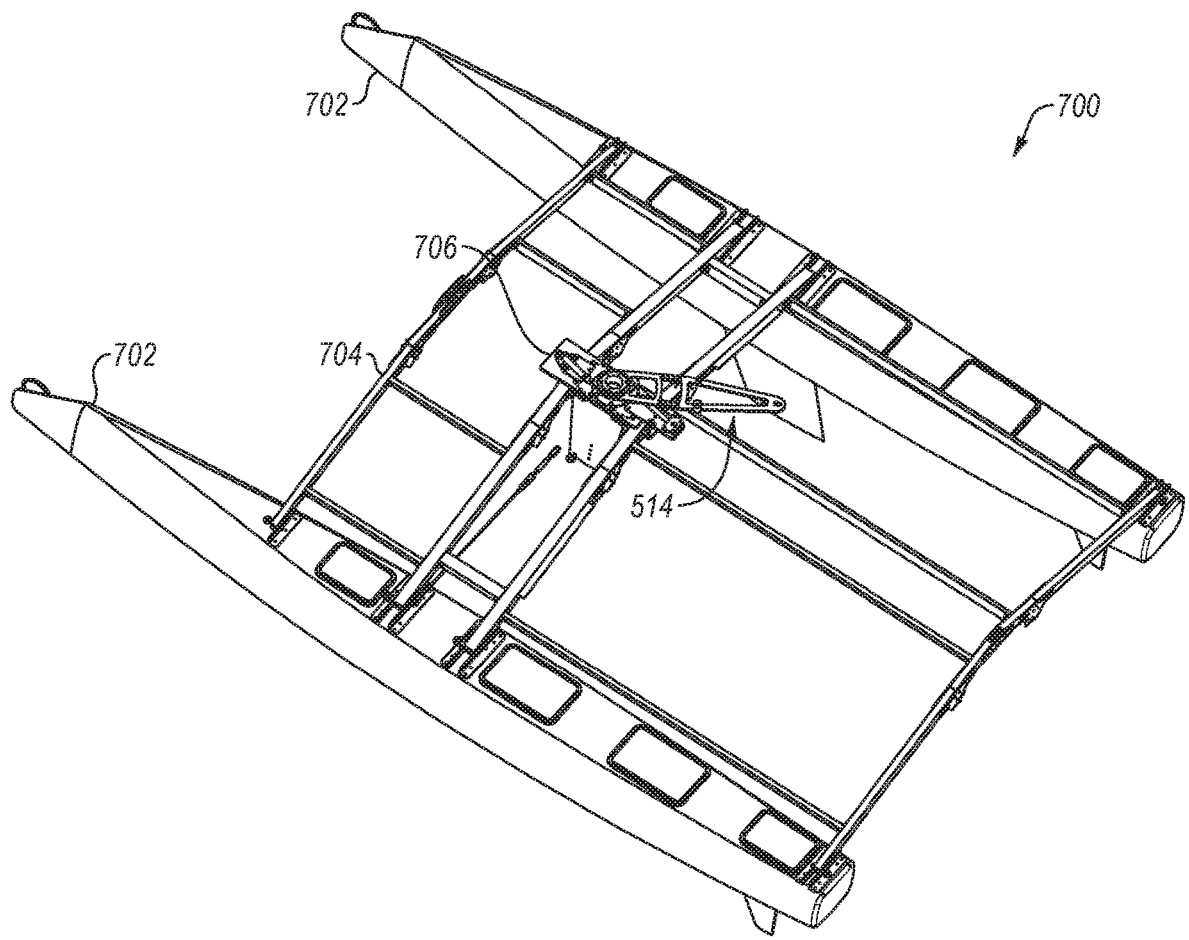
FIG. 7A illustrates the camber control boom of FIGS. 5A-6 attached to a portion of an autonomous sailing vessel.

A further embodiment for controlling the overall motion of the camber control boom 514 and the sail 502 is described below with respect to FIGS. 7A and 7B. FIG. 7A illustrates the camber control boom 514 of FIGS. 5A-6 attached to a portion of an autonomous sailing vessel 700, arranged in accordance with at least one embodiment described herein. The illustrated portion of the autonomous sailing vessel 700 includes hulls 702, a connector structure 704, and a fixed structure 706. The hulls 702, connector structure 704, and fixed structure 706 may include, be included in, or correspond to the other hulls, connector structure, and fixed structure discussed herein. FIG. 7B is a detail view of a portion of the autonomous sailing vessel 700 of FIG. 7A, arranged in accordance with at least one embodiment described herein.

In general, the camber control boom 514 is free to rotate about the sail axis. FIG. 7B illustrates a means of constraining the motion of the camber control boom 514 relative to the fixed structure 706. As illustrated, the autonomous sailing vessel 700 includes one or both of a fore rotational constraint device 708A and an aft rotational constraint device 708B (hereinafter generically "rotational constraint device 708" or collectively "rotational constraint devices 708"). Near the rotation axis of the camber control boom 514, the rotational constraint devices 708 are coupled to a fore and aft boom pin pivot 710A, 710B (hereinafter generically "boom pin pivot 710" or collectively "boom pin pivots 710") of the camber control boom 514. In particular, an aft end of the fore rotational constraint device 708A is coupled to the fore boom pin pivot 710A and a fore end of the aft rotational constraint device 708B is coupled to the aft boom pin pivot 710B. A fore end of the fore rotational constraint device 708A is coupled to a fore constraint pin pivot 712A and an aft end of the aft rotational constraint device 708B is coupled to an aft constraint pin pivot 712B. The fore constraint pin pivot 712A and the aft constraint pin pivot are referred to hereinafter generically as "constraint pin pivot 712" or collectively as "constraint pin pivots 712".

As the camber control boom 514 rotates about the mast axis, the distance spanned by each of the rotational constraint devices 708 between the corresponding constraint pin pivots 712 and boom pin pivots will change length, thereby changing the lengths of the rotational constraint devices. The rotational constraint devices 708 may limit a range of motion of the camber control boom 514 and of the sail 502 (FIGS. 5A, 5B) with which the camber control boom 514 interacts. When a maximum length of the rotational constraint device 708 is reached, the rotational constraint device 708 may stop further motion of the camber control boom 514. Because the rotational constraint devices 708 are mounted symmetrically on the autonomous sailing vessel 700, e.g., one fore and one aft of the mast in this example, the same rotational constraint device can stop the camber control boom 514 on both the port and starboard side of the autonomous sailing vessel 700.

In FIG. 7B, the fore rotational constraint device 708A and the aft rotational constraint device 708B function the same. Where one is placed is a matter of convenience. Further, while both rotational constraint devices 708 are described as limiting motion, in other embodiments, one of the rotational constraint devices 708 may be used as a motion constraint while the other may be used as a speed constraint. For example, the aft rotational constraint device 708B may be a simple gas spring that limits motion while the fore rotational constraint device 708A may be a damping device that applies a constraint force proportional to the speed of elongation of the fore rotational constraint device 708A.

In the example of FIG. 7B, each of the rotational constraint devices 708 is rotatably coupled at a fore or aft end to the fixed structure of the autonomous sailing vessel 700, e.g., through the constraint pin pivots 712, to which the mast of the autonomous sailing vessel 700 is mounted. The opposite end of each of the rotational constraint devices 708 is rotatably coupled to the camber control boom, and specifically to the boom pin pivots 710. Rotation of the camber control boom 514 relative to the fixed structure 706 changes the length of the rotational constraint device 708. Further, the length of each of the rotational constraint devices 708 may be adjustable within a predetermined length range that limits rotation of the camber control boom 514 relative to the fixed structure 706 to a corresponding predetermined angular range.

The rotational constraint devices 708 may be used as sail release devices. As wind speeds increases, the wind force on the sail increases. Each of the rotational constraint devices 708 may react with increased force as it gets longer. The rotational constraint devices 708 may be sized so that when a critical amount of wind force is applied to the sail, e.g., at the spill threshold, the sail becomes rotated to align the sail's longitudinal axis substantially with the wind to effectively depower the sail.

Although the subject matter has been described in language specific to structural features or methodological acts, it is to be understood that the subject matter configured in the appended claims is not necessarily limited to the specific features or acts described above. Rather, the specific features and acts described above are disclosed as example forms of implementing the claims.

Unless specific arrangements described herein are mutually exclusive with one another, the various implementations described herein can be combined in whole or in part to enhance system functionality or to produce complementary functions. Likewise, aspects of the implementations may be implemented in standalone arrangements. Thus, the above description has been given by way of example only and modification in detail may be made within the scope of the present invention.

With respect to the use of substantially any plural or singular terms herein, those having skill in the art can translate from the plural to the singular or from the singular to the plural as is appropriate to the context or application. The various singular/plural permutations may be expressly set forth herein for sake of clarity. A reference to an element in the singular is not intended to mean "one and only one" unless specifically stated, but rather "one or more." Moreover, nothing disclosed herein is intended to be dedicated to the public regardless of whether such disclosure is explicitly recited in the above description.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that include A alone, B alone, C alone, A and B together, A and C together, B and C together, or A, B, and C together, etc.). Also, a phrase presenting two or more alternative terms, whether in the description, claims, or drawings, should be understood to include one of the terms, either of the terms, or both terms. For example, the phrase "A or B" will be understood to include the possibilities of "A" or "B" or "A and B."

The present invention may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An autonomous sailing vessel, comprising:
   a hull;
   a mast mechanically coupled to the hull;
   a sail mechanically coupled to the mast; and
   a sail release device operably coupled to the sail and configured to automatically release the sail to spill excess wind based on control of at least one of an angular position of the sail or a camber angle of the sail, wherein the sail release device is responsive to comparison of sensed parameters attributable to the sail mechanically coupled to the mast with at least one of torque threshold or a force threshold.

2. The autonomous sailing vessel of claim 1, wherein the sail release device is coupled to a fixed structure of the autonomous sailing vessel and is further configured to confine angular position of the sail relative to the fixed structure within a predetermined angular range absent excess wind.

3. The autonomous sailing vessel of claim 1, further comprising an actuator coupled between the sail and a fixed structure of the autonomous sailing vessel and configured to control angular position of the sail relative to the fixed structure, wherein the sail release device is coupled in-line with the actuator.

4. The autonomous sailing vessel of claim 1, further comprising:
   at least one sensor configured to generate a measurement of at least one of: a force of wind on the sail, relative or absolute wind speed, pitch angle of the autonomous sailing vessel, roll angle of the autonomous sailing vessel, or a torque on the sail; and
   a control unit communicatively coupled to the at least one sensor and the sail release device, wherein the control unit is configured to command the sail release device to release the sail in response to the measurement being in excess of a spill threshold.

5. The autonomous sailing vessel of claim 1, wherein the sail release device comprises a spring-loaded latch arm configured to automatically release the sail responsive to excess wind on the sail loading the spring-loaded latch arm beyond a spill threshold.

6. The autonomous sailing vessel of claim 5, wherein:
the sail release device further comprises a spring that spring loads the spring-loaded latch arm; and
a stiffness or preload of the spring is adjustable.

7. The autonomous sailing vessel of claim 1, wherein in response to the sail release device automatically releasing the sail, the sail is free to rotate relative to the hull to a depowered position at which wind loads on the sail are significantly less than prior to release of the sail by the sail release device.

8. The autonomous sailing vessel of claim 7, further comprising a sail relatch device configured to automatically relatch the sail in a powered position responsive to rotation of the sail from the depowered position to the powered position.

9. The autonomous sailing vessel of claim 8, further comprising:
a control surface movably coupled to the hull and configured to be at least partially submerged in water during normal operation of the autonomous sailing vessel;
an actuator operably coupled to the control surface and configured to steer the autonomous sailing vessel by controlling position of the control surface relative to the hull; and
a control unit communicatively coupled to the actuator and configured to control the actuator to steer the autonomous sailing vessel into an orientation relative to the wind in which the wind causes the sail to rotate from the depowered position to the powered position.

10. The autonomous sailing vessel of claim 8, wherein: the sail release device comprises:
a latch arm rotatably coupled to a fixed structure of the autonomous sailing vessel, the latch arm rotatable relative to the fixed structure between a first latch position and a release position;
a latch arm spring coupled between a first end of the latch arm and the fixed structure, the latch arm spring configured to resist rotation of the latch arm from the first latch position to the release position; and
a relatch arm rotatably coupled to a second end of the latch arm, the relatch arm rotatable relative to the latch arm between a second latch position and a relatch position, the relatch arm configured to cooperate with the latch arm to retain the sail in the powered position absent excess wind; and
the sail relatch device comprises:
the relatch arm; and
a relatch arm spring coupled between the relatch arm and a spring mount on the latch arm, the relatch arm spring configured to resist rotation of the relatch arm from the second latch position to the relatch position.

11. The autonomous sailing vessel of claim 10, wherein a resistance of the relatch arm spring to rotation of the relatch arm from the second latch position to the relatch position is significantly less than a resistance of the latch arm spring to rotation of the latch arm from the first latch position to the release position.

12. The autonomous sailing vessel of claim 1, further comprising a manual sail release device operably coupled to the sail and configured to release the sail from a powered position to a depowered position responsive to manual operation of the manual sail release device by a user.

13. The autonomous sailing vessel of claim 1, wherein:
the sail release device is coupled to a fixed structure of the autonomous sailing vessel and is further configured to confine angular position of the sail relative to the fixed structure within a predetermined angular range absent excess wind;
the sail release device comprises two mechanical stops that engage with a portion of the sail to define boundaries of the predetermined angular range;
the sail is free to move within the predetermined angular range; and
the autonomous vessel further comprises a damping device configured to reduce rotational speed of the sail before the portion of the sail engages either mechanical stop as the sail moves between the boundaries of the predetermined angular range.

14. The autonomous sailing vessel of claim 1, wherein the sail comprises a fore sail element rotatably coupled to the mast and an aft sail element rotatably coupled at a fore of the aft sail element to an aft of the fore sail element, the autonomous sailing vessel further comprising a camber control assembly to set a camber angle between the fore and aft sail elements.

15. The autonomous sailing vessel of claim 14, wherein the camber control assembly is configured to automatically set the camber angle based on a position of the fore sail element relative to a fixed structure of the autonomous sailing vessel to which the mast is coupled.

16. An autonomous sailing vessel, comprising:
a hull;
a mast mechanically coupled to the hull;
a sail mechanically coupled to the mast, wherein the sail comprises a fore sail element coupled to the mast and an aft sail element rotatably coupled at a fore of the aft sail element to an aft of the fore sail element; and
a camber control assembly to automatically set a camber angle between the fore and aft sail elements based on control of at least one of an angular position of the sail or a camber angle of the sail, wherein a sail release device is responsive to comparison of sensed parameters attributable to the sail mechanically coupled to the mast with at least one of torque threshold or a force threshold.

17. The autonomous sailing vessel of claim 16, wherein the camber control assembly comprises:
a camber control cam coupled to a fixed structure of the autonomous sailing vessel;
a camber control arm coupled to the aft sailing element; and
a cam follower that extends from the camber control arm to movably engage the camber control cam,
wherein the camber angle is automatically set, as the sail rotates relative to the mast, to a value determined by a geometry of the camber control cam and the camber control arm.

18. The autonomous sailing vessel of claim 16, wherein:
the camber control assembly comprises a camber control boom rotatably coupled to the mast and a hinge pin that rotatably couples the fore sail element to the aft sail element; and the camber angle is automatically controlled by automatically constraining movement of the hinge pin relative to the camber control boom.

19. The autonomous sailing vessel of claim 16, further comprising a rotational constraint device, wherein:
- the rotational constraint device is rotatably coupled at a fore or aft end to a fixed structure of the autonomous sailing vessel to which the mast is mounted and rotatably coupled at an opposite end to a camber control boom;
- rotation of the camber control boom relative to the fixed structure changes a length of the rotational constraint device; and
- the length of the rotational constraint device is adjustable within a predetermined length range that limits rotation of the camber control boom relative to the fixed structure to a corresponding predetermined angular range.

20. The autonomous sailing vessel of claim 16, wherein the camber control assembly comprises:
- a hinge that rotatably couples the fore sail element to the aft sail element;
- an aft pin that extends from an aft end of the aft sail element into an aft slot of a camber control boom; and
- the camber control boom rotatably coupled at a fore end of the camber control boom to the mast, the camber control boom including a camber control stop between the fore end and an aft end of the camber control boom, the camber control stop positioned to engage a portion of the hinge, the fore sail element, or the aft sail element to automatically set the camber angle between the fore and aft sail elements.

\* \* \* \* \*